US009860897B2

(12) United States Patent
Chen et al.

(10) Patent No.: US 9,860,897 B2
(45) Date of Patent: Jan. 2, 2018

(54) TECHNIQUES FOR TRANSMITTING UPLINK CONTROL INFORMATION FOR A COMPONENT CARRIER

(71) Applicant: QUALCOMM Incorporated, San Diego, CA (US)

(72) Inventors: Wanshi Chen, San Diego, CA (US); Aleksandar Damnjanovic, Del Mar, CA (US); Madhavan Srinivasan Vajapeyam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/858,425

(22) Filed: Sep. 18, 2015

(65) Prior Publication Data

US 2016/0100406 A1    Apr. 7, 2016

Related U.S. Application Data

(60) Provisional application No. 62/060,986, filed on Oct. 7, 2014.

(51) Int. Cl.
*H04W 72/04* (2009.01)
*H04W 72/08* (2009.01)
(Continued)

(52) U.S. Cl.
CPC ....... *H04W 72/0453* (2013.01); *H04L 5/1423* (2013.01); *H04W 72/0413* (2013.01); *H04W 72/08* (2013.01); *H04W 72/1278* (2013.01)

(58) Field of Classification Search
CPC ......... H04W 72/0453; H04W 72/0413; H04W 72/1278; H04W 72/08; H04L 5/1423
See application file for complete search history.

(56) References Cited

U.S. PATENT DOCUMENTS

| 2012/0140743 A1 | 6/2012 | Pelletier et al. |
| 2012/0178494 A1 | 7/2012 | Haim et al. |

(Continued)

FOREIGN PATENT DOCUMENTS

| EP | 2398181 A2 | 12/2011 |
| WO | WO-2012136269 A1 | 10/2012 |

OTHER PUBLICATIONS

LG Electronics, "Candidate Solutions for LAA Operation", 3GPP TSG RAN WG1 Meeting #78bis. R1-144042, Ljubljana, Slovenia, Oct. 6-10, 2014, 6 pgs., XP050869704, 3rd Generation Partnership Project.

(Continued)

*Primary Examiner* — Jianye Wu
(74) *Attorney, Agent, or Firm* — Holland & Hart LLP

(57) ABSTRACT

Techniques are described for wireless communication. One method includes determining a set of uplink (UL) component carriers (CCs) to use for a user equipment (UE). The set of UL CCs may include at least one UL CC in a first radio frequency spectrum band and at least one UL CC in a second radio frequency spectrum band. The method further includes identifying, for a subframe, uplink control information (UCI) due for transmission, the UCI associated with one or more CCs, and limiting available UL CCs for transmission of the UCI to the at least one UL CC in the first radio frequency spectrum band.

38 Claims, 15 Drawing Sheets

(51) Int. Cl.
*H04W 72/12* (2009.01)
*H04L 5/14* (2006.01)

(56) References Cited

U.S. PATENT DOCUMENTS

2013/0155832 A1* 6/2013 Yang ............... H04L 1/0026
                                              370/203
2013/0229998 A1* 9/2013 Noh ................ H04L 5/001
                                              370/329
2014/0036704 A1   2/2014 Han et al.

OTHER PUBLICATIONS

IPEA/EP, Second Written Opinion of the International Preliminary Examining Authority, Int'l Application No. PCT/US2015/051136, Sep. 21, 2016, European Patent Office, Rijswijk, NL, 6 pgs.
ISA/EPO, International Search Report and Written Opinion of the International Searching Authority, Int'l. App. No. PCT/US2015/051136, Dec. 7, 2015, European Patent Office, Rijswijk, NL, 12 pgs.

* cited by examiner

TECHNIQUES FOR TRANSMITTING UPLINK CONTROL INFORMATION FOR A COMPONENT CARRIER

CROSS REFERENCES

The present application for patent claims priority to U.S. Provisional Patent Application No. 62/060,986 by Chen et al., entitled "Techniques for Transmitting Uplink Control Information for an Uplink Component Carrier," filed Oct. 7, 2014, assigned to the assignee hereof, and which is hereby incorporated by reference in its entirety.

BACKGROUND

Field of the Disclosure

The present disclosure, for example, relates to wireless communication systems, and more specifically to techniques for transmitting uplink control information for a component carrier.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel usage beacon signal (CUBS) may be transmitted to reserve the channel.

In some modes of operation, a UE may operate in a carrier aggregation mode or dual-connectivity mode in which the UE may be configured to communicate with one or more base stations using a plurality of component carriers (CCs). When communicating on an uplink, a UE may transmit uplink control information for one or more uplink (UL) CCs.

SUMMARY

The present disclosure, for example, relates to one or more techniques for transmitting uplink control information (UCI) for a component carrier. When a user equipment (UE) is communicating with a base station on an uplink, the UE may sometimes communicate in an uplink carrier aggregation mode or dual-connectivity mode. When the UE is also communicating with the base station using at least one uplink (UL) component carrier (CC) in a dedicated radio frequency spectrum band and at least one UL CC in a shared radio frequency spectrum band, the UE may select a UL CC in the dedicated radio frequency spectrum band and/or a UL CC in the shared radio frequency spectrum band for transmitting UCI. In some scenarios, and as described in the present disclosure, a UL CC in the dedicated radio frequency spectrum band may be more reliable than a UL CC in the shared radio frequency spectrum band, and it may be useful to configure or bias a UE to select a UL CC in the dedicated radio frequency spectrum band for transmitting UCI.

A method for wireless communication is described. In one example, the method includes determining a set of UL CCs to use for a UE. The set of UL CCs may include at least one UL CC in a first radio frequency spectrum band and at least one UL CC in a second radio frequency spectrum band. The method further includes identifying, for a subframe, UCI due for transmission. The UCI may be associated with one or more CCs. The method further includes limiting available UL CCs for transmission of the UCI to the at least one UL CC in the first radio frequency spectrum band.

In some examples of the method, the first radio frequency spectrum band may be a dedicated radio frequency spectrum band, and the second radio frequency spectrum band may be a shared radio frequency spectrum band. In some examples of the method, the determining may include determining the set of UL CCs for an uplink carrier aggregation operation. In some examples of the method, the determining may include determining the set of UL CCs for a dual-connectivity operation, for use as a primary group of CCs or a secondary group of CCs in the dual-connectivity operation.

In some examples of the method, the limiting may include determining that the UE is not configured for parallel physical uplink control channel (PUCCH) and physical uplink shared channel (PUSCH) transmissions during the subframe. In some examples, the method may include determining that a PUSCH transmission is unavailable in the first radio frequency spectrum band during the subframe, and limiting the available UL CCs to a PUCCH CC in the first radio frequency spectrum band. In some examples, the method may include determining that at least one PUSCH transmission is available in the first radio frequency spectrum band during the subframe, and limiting the available UL CCs to a first PUSCH CC in the first radio frequency spectrum band. In some examples, the method may include selecting the first PUSCH CC based at least in part on aperiodic channel state information (CSI) being triggered to be transmitted on the first PUSCH CC during the subframe. In some examples, the method may include selecting the first PUSCH CC based at least in part on a first CC index associated with the first PUSCH CC. In some examples of the method, selecting the first PUSCH CC based at least in part on the first CC index may include selecting the first PUSCH CC based at least in part on the first CC index being lower than a second CC index associated with a second PUSCH CC.

In some examples of the method, the limiting may include determining that the UE is configured for parallel PUCCH and PUSCH transmissions during the subframe. In some examples, the method may include determining that a PUSCH transmission is unavailable in the first radio frequency spectrum band during the subframe, and limiting the available UL CCs to a PUCCH CC in the first radio frequency spectrum band. In some examples, the method may include determining that at least one PUSCH transmission is available in the first radio frequency spectrum band during the subframe; determining that the UCI includes a first type of information; and limiting the available UL CCs to a PUCCH CC in the first radio frequency spectrum band based at least in part on the first type of information. In some examples of the method, the first type of information may include a scheduling request (SR), or an acknowledgement (ACK)/non-acknowledgement (NAK), or an SR and an ACK/NAK, or periodic CSI.

In some examples, the method may include determining that at least one PUSCH transmission is available in the first radio frequency spectrum band during the subframe; determining that the UCI includes a second type of information; limiting the available UL CCs to a PUSCH CC in the first radio frequency spectrum band to transmit a first portion of the second type of information; and limiting the available UL CCs to a PUCCH CC in the first radio frequency spectrum band to transmit a second portion of the second type of information. In some examples, the second type of information may include periodic CSI and at least one of: an SR, an ACK/NAK, or a combination of the SR and the ACK/NAK. In some examples of the method, the first portion of the second type of information may include the periodic CSI, and the second portion of the second type of information may include the SR, the ACK/NAK, or the combination of the SR and the ACK/NAK.

In some examples of the method, the UCI may include at least one type of periodic UCI. In some examples of the method, the UCI may include all types of periodic UCI. In some examples of the method, the UCI may include aperiodic CSI. In some examples, the method may include transmitting aperiodic CSI for a first UL CC in the second radio frequency spectrum band, for the subframe, over the first UL CC in the second radio frequency spectrum band. In some examples, the method may include transmitting aperiodic CSI for a second UL CC in the first radio frequency spectrum band, for the subframe, over the second UL CC in the first radio frequency spectrum band.

An apparatus for wireless communication is described. In one example, the apparatus includes means for determining a set of UL CCs to use for a UE. The set of UL CCs may include at least one UL CC in a first radio frequency spectrum band and at least one UL CC in a second radio frequency spectrum band. The apparatus further includes means for identifying, for a subframe, UCI due for transmission. The UCI may be associated with one or more CCs. The apparatus further includes means for limiting available UL CCs for transmission of the UCI to the at least one UL CC in the first radio frequency spectrum band.

In some examples, the first radio frequency spectrum band may be a dedicated radio frequency spectrum band, and the second radio frequency spectrum band may be a shared radio frequency spectrum band. Some examples of the apparatus may include means for determining the set of UL CCs for an uplink carrier aggregation operation. Some examples of the apparatus may include means for determining the set of UL CCs for a dual-connectivity operation, for use as a primary group of CCs or a secondary group of CCs in the dual-connectivity operation.

In some examples, the means for limiting may include means for determining that the UE is not configured for parallel PUCCH and PUSCH transmissions during the subframe. In some examples, the apparatus may include means for determining that a PUSCH transmission is unavailable in the first radio frequency spectrum band during the subframe, and means for limiting the available UL CCs to a PUCCH CC in the first radio frequency spectrum band. In some examples, the apparatus may include means for determining that at least one PUSCH transmission is available in the first radio frequency spectrum band during the subframe, and means for limiting the available UL CCs to a first PUSCH CC in the first radio frequency spectrum band. In some examples, the apparatus may include means for selecting the first PUSCH CC based at least in part on aperiodic CSI being triggered to be transmitted on the first PUSCH CC during the subframe. In some examples, the apparatus may include means for selecting the first PUSCH CC based at least in part on a first CC index associated with the first PUSCH CC. In some examples of the apparatus, the means for selecting the first PUSCH CC based at least in part on the first CC index may include means for selecting the first PUSCH CC based at least in part on the first CC index being lower than a second CC index associated with a second PUSCH CC.

In some examples of the apparatus, the means for limiting may include means for determining that the UE is configured for parallel PUCCH and PUSCH transmissions during the subframe. In some examples, the apparatus may include means for determining that a PUSCH transmission is unavailable in the first radio frequency spectrum band during the subframe, and means for limiting the available UL CCs to a PUCCH CC in the first radio frequency spectrum band. In some examples, the apparatus may include means for determining that at least one PUSCH transmission is available in the first radio frequency spectrum band during the subframe; means for determining that the UCI includes a first type of information; and means for limiting the available UL CCs to a PUCCH CC in the first radio frequency spectrum band based at least in part on the first type of information. In some examples of the apparatus, the first type of information may include an SR, or an ACK)/NAK, or an SR and an ACK/NAK, or periodic CSI.

In some examples, the apparatus may include means for determining that at least one PUSCH transmission is available in the first radio frequency spectrum band during the subframe; means for determining that the UCI includes a second type of information; means for limiting the available UL CCs to a PUSCH CC in the first radio frequency spectrum band to transmit a first portion of the second type of information; and means for limiting the available UL CCs to a PUCCH CC in the first radio frequency spectrum band to transmit a second portion of the second type of information. In some examples, the second type of information may include periodic CSI and at least one of: an SR, an ACK/NAK, or a combination of the SR and the ACK/NAK. In some examples of the apparatus, the first portion of the second type of information may include the periodic CSI, and the second portion of the second type of information may include the SR, the ACK/NAK, or the combination of the SR and the ACK/NAK.

In some examples, the UCI may include at least one type of periodic UCI. In some examples, the UCI may include all types of periodic UCI. In some examples, the UCI may include aperiodic CSI. In some examples, the apparatus may include means for transmitting aperiodic CSI for a first UL CC in the second radio frequency spectrum band, for the subframe, over the first UL CC in the second radio frequency spectrum band. In some examples, the apparatus may include means for transmitting aperiodic CSI for a second UL CC in the first radio frequency spectrum band, for the subframe, over the second UL CC in the first radio frequency spectrum band.

Another apparatus for wireless communication is described. In one example, the apparatus includes a processor and memory in electronic communication with the processor. The processor and memory may be configured to determine a set of UL CCs to use for a UE. The set of UL CCs may include at least one UL CC in a first radio frequency spectrum band and at least one UL CC in a second radio frequency spectrum band. The processor and memory may be configured to identify, for a subframe, UCI due for transmission. The UCI may be associated with one or more CCs. The processor and memory may be configured to limit available UL CCs for transmission of the UCI to the at least one UL CC in the first radio frequency spectrum band.

In some examples, the first radio frequency spectrum band may be a dedicated radio frequency spectrum band, and the second radio frequency spectrum band may be a shared radio frequency spectrum band. In some examples, the processor and memory may be configured to determine the set of UL CCs for an uplink carrier aggregation operation. In some examples, the processor and memory may be configured to determine the set of UL CCs for a dual-connectivity operation, for use as a primary group of CCs or a secondary group of CCs in the dual-connectivity operation.

In some examples, the processor and memory may be configured to determine that the UE is not configured for parallel PUCCH and PUSCH transmissions during the subframe. In some examples, the processor and memory may be configured to determine that a PUSCH transmission is unavailable in the first radio frequency spectrum band during the subframe, and limit the available UL CCs to a PUCCH CC in the first radio frequency spectrum band. In some examples, the processor and memory may be configured to determine that at least one PUSCH transmission is available in the first radio frequency spectrum band during the subframe, and limit the available UL CCs to a first PUSCH CC in the first radio frequency spectrum band. In some examples, the processor and memory may be configured to select the first PUSCH CC based at least in part on aperiodic CSI being triggered to be transmitted on the first PUSCH CC during the subframe. In some examples, the processor and memory may be configured to select the first PUSCH CC based at least in part on a first CC index associated with the first PUSCH CC. In some examples, the processor and memory may be configured to select the first PUSCH CC based at least in part on the first CC index being lower than a second CC index associated with a second PUSCH CC.

In some examples, the processor and memory may be configured to determine that the UE is configured for parallel PUCCH and PUSCH transmissions during the subframe. In some examples, the processor and memory may be configured to determine that a PUSCH transmission is unavailable in the first radio frequency spectrum band during the subframe, and limit the available UL CCs to a PUCCH CC in the first radio frequency spectrum band. In some examples, the processor and memory may be configured to determine that at least one PUSCH transmission is available in the first radio frequency spectrum band during the subframe; determine that the UCI includes a first type of information; and limit the available UL CCs to a PUCCH CC in the first radio frequency spectrum band based at least in part on the first type of information. In some examples, the first type of information may include an SR, ACK)/NAK, or an SR and an ACK/NAK, or periodic CSI.

In some examples, the processor and memory may be configured to determine that at least one PUSCH transmission is available in the first radio frequency spectrum band during the subframe; determine that the UCI includes a second type of information; limit the available UL CCs to a PUSCH CC in the first radio frequency spectrum band to transmit a first portion of the second type of information; and limit the available UL CCs to a PUCCH CC in the first radio frequency spectrum band to transmit a second portion of the second type of information. In some examples, the second type of information may include periodic CSI and at least one of: an SR, an ACK/NAK, or a combination of the SR and the ACK/NAK. In some examples of the apparatus, the first portion of the second type of information may include the periodic CSI, and the second portion of the second type of information may include the SR, the ACK/NAK, or the combination of the SR and the ACK/NAK.

In some examples, the UCI may include at least one type of periodic UCI. In some examples, the UCI may include all types of periodic UCI. In some examples, the UCI may include aperiodic CSI. In some examples, the processor and memory may be configured to transmit aperiodic CSI for a first UL CC in the second radio frequency spectrum band, for the subframe, over the first UL CC in the second radio frequency spectrum band. In some examples, the processor and memory may be configured to transmit aperiodic CSI for a second UL CC in the first radio frequency spectrum band, for the subframe, over the second UL CC in the first radio frequency spectrum band.

A non-transitory computer-readable medium storing computer-executable code for wireless communications is described. In one example, the code may be executable by a processor to determine a set of UL CCs to use for a UE. The set of UL CCs may include at least one UL CC in a first radio frequency spectrum band and at least one UL CC in a second radio frequency spectrum band. The code may also be executable by the processor to identify, for a subframe, UCI due for transmission. The UCI may be associated with one or more CCs. The code may also be executable by the processor to limit available UL CCs for transmission of the UCI to the at least one UL CC in the first radio frequency spectrum band.

In some examples, the first radio frequency spectrum band may be a dedicated radio frequency spectrum band, and the second radio frequency spectrum band may be a shared radio frequency spectrum band. In some examples, the code may be executable by the processor to determine the set of UL CCs for an uplink carrier aggregation operation. In some examples, the code may be executable by the processor to determine the set of UL CCs for a dual-connectivity operation, for use as a primary group of CCs or a secondary group of CCs in the dual-connectivity operation.

In some examples, the code may be executable by the processor to determine that the UE is not configured for parallel PUCCH) and PUSCH transmissions during the subframe. In some examples, the code may be executable by the processor to determine that a PUSCH transmission is unavailable in the first radio frequency spectrum band during the subframe, and limit the available UL CCs to a PUCCH CC in the first radio frequency spectrum band. In some examples, the code may be executable by the processor to determine that at least one PUSCH transmission is available in the first radio frequency spectrum band during the subframe, and limit the available UL CCs to a first PUSCH CC in the first radio frequency spectrum band. In some examples, the code may be executable by the processor to select the first PUSCH CC based at least in part on aperiodic CSI being triggered to be transmitted on the first PUSCH CC during the subframe. In some examples, the code may be executable by the processor to select the first PUSCH CC based at least in part on a first CC index associated with the first PUSCH CC. In some examples, the code may be executable by the processor to select the first PUSCH CC based at least in part on the first CC index being lower than a second CC index associated with a second PUSCH CC.

In some examples, the code may be executable by the processor to determine that the UE is configured for parallel PUCCH and PUSCH transmissions during the subframe. In some examples, the code may be executable by the processor to determine that a PUSCH transmission is unavailable in the first radio frequency spectrum band during the subframe, and limit the available UL CCs to a PUCCH CC in the first radio frequency spectrum band. In some examples, the code may be executable by the processor to determine that at least one PUSCH transmission is available in the first radio frequency spectrum band during the subframe; determine that the UCI includes a first type of information; and limit the available UL CCs to a PUCCH CC in the first radio frequency spectrum band based at least in part on the first type of information. In some examples, the first type of information may include an SR, or an ACK/NAK, or an SR and an ACK/NAK, or periodic CSI.

In some examples, the code may be executable by the processor to determine that at least one PUSCH transmission is available in the first radio frequency spectrum band during the subframe; determine that the UCI includes a second type of information; limit the available UL CCs to a PUSCH CC in the first radio frequency spectrum band to transmit a first portion of the second type of information; and limit the available UL CCs to a PUCCH CC in the first radio frequency spectrum band to transmit a second portion of the second type of information. In some examples, the second type of information may include periodic CSI and at least one of: an SR, an ACK/NAK, or a combination of the SR and the ACK/NAK. In some examples, the first portion of the second type of information may include the periodic CSI, and the second portion of the second type of information may include the SR, the ACK/NAK, or the combination of the SR and the ACK/NAK.

In some examples, the UCI may include at least one type of periodic UCI. In some examples, the UCI may include all types of periodic UCI. In some examples, the UCI may include aperiodic CSI. In some examples, the code may be executable by the processor to transmit aperiodic CSI for a first UL CC in the second radio frequency spectrum band, for the subframe, over the first UL CC in the second radio frequency spectrum band. In some examples, the code may be executable by the processor to transmit aperiodic CSI for a second UL CC in the first radio frequency spectrum band, for the subframe, over the second UL CC in the first radio frequency spectrum band.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
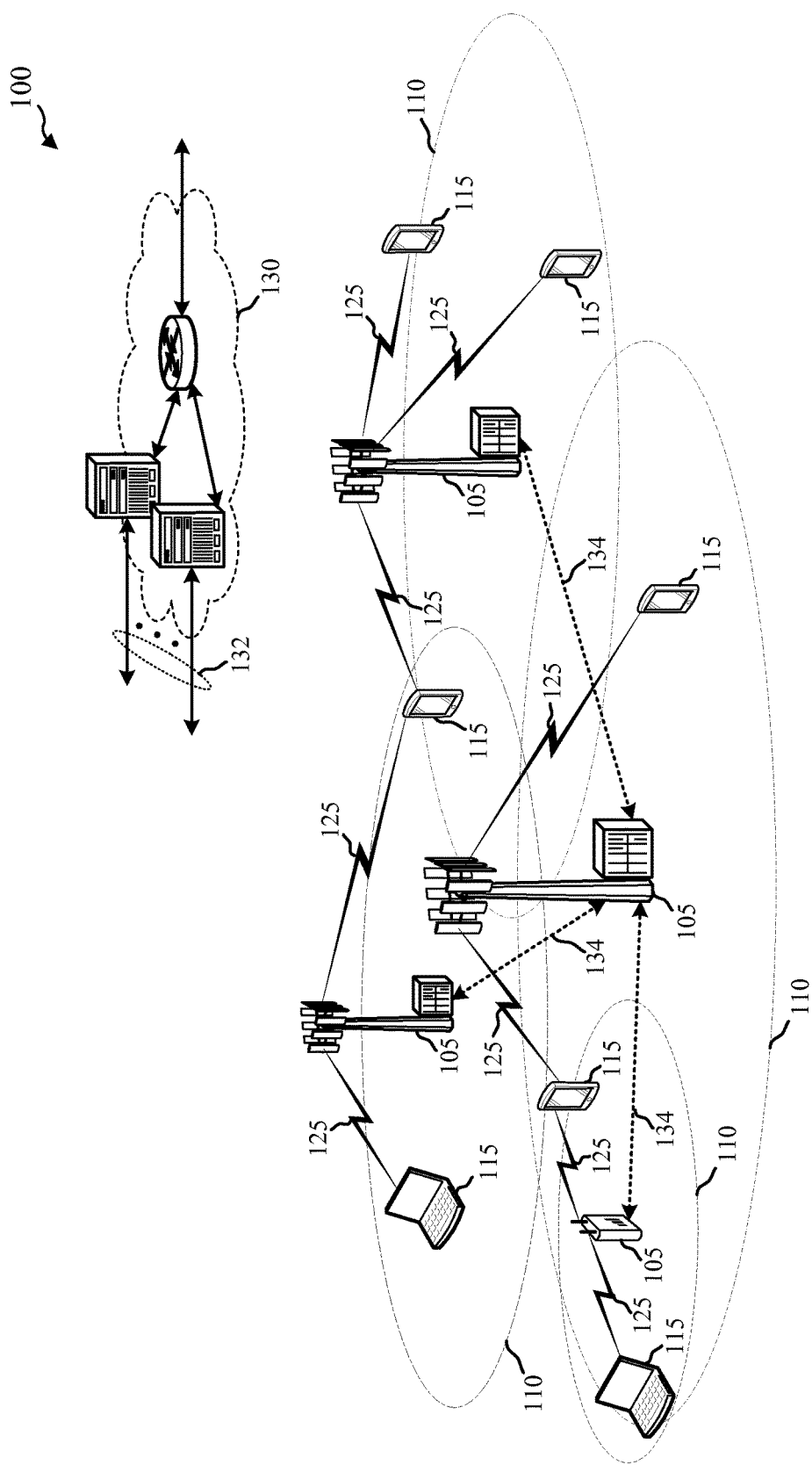
FIG. 1 illustrates an example of a wireless communication system, in accordance with various aspects of the disclosure.

Techniques are described in which a shared radio frequency spectrum band is used for at least a portion of communications over a wireless communication system. In some examples, the shared radio frequency spectrum band may be used for Long Term Evolution (LTE) communications or LTE-Advanced (LTE-A) communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to some users, such as a licensed radio frequency spectrum band usable for LTE/LTE-A communications. The shared radio frequency spectrum band may be a radio frequency spectrum band for which a device may contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform a listen before talk (LBT) procedure to gain access to the medium. Such an LBT procedure may include performing a clear channel assessment (CCA) procedure (or extended CCA procedure) to determine whether a channel of the shared radio frequency spectrum band is available. When it is determined that the channel of the shared radio frequency spectrum band is available, a channel usage beacon signal (CUBS) may be transmitted to reserve the channel. When it is determined that a channel is not available, a CCA procedure (or extended CCA procedure) may be performed for the channel again at a later time.

After a user equipment (UE) wins contention for access to a shared radio frequency spectrum band, the UE may communicate with a base station on an uplink. In some examples, the UE may communicate on the uplink (UL) in an uplink carrier aggregation mode or a dual-connectivity mode. When the UE is also communicating with the base station using at least one UL component carrier (CC) in a dedicated radio frequency spectrum band and at least one UL CC in the shared radio frequency spectrum band, the UE may have to select a UL CC in the dedicated radio frequency spectrum band and/or a UL CC in the shared radio frequency spectrum band for transmitting uplink control information (UCI). In some scenarios, a UL CC in the dedicated radio frequency spectrum band may be more reliable than a UL CC in the shared radio frequency spectrum band, and it may be useful to configure or bias the UE to select a UL CC in the dedicated radio frequency spectrum band for transmitting UCI (e.g., one or more of a scheduling request (SR), an acknowledgement (ACK)/non-acknowledgement (NAK), periodic channel state information (CSI), or aperiodic CSI).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements (ACKs) or non-acknowledgements (NAKs) of downlink transmissions, or channel state information (CSI). UL transmissions may also include transmissions of data, which data may be transmitted over a physical uplink shared channel (PUSCH) or enhanced PUSCH (ePUSCH). UL transmissions may also include the transmission of a scheduling request (SR) or enhanced SR (eSR). References in this disclosure to a PUCCH, a PUSCH, or an SR are presumed to inherently include references to a respective ePUCCH, ePUSCH, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC.

In some examples, the wireless communication system 100 may support operation over a dedicated radio frequency spectrum band (e.g., a radio frequency spectrum band for which transmitting apparatuses may not contend for access because the radio frequency spectrum band is licensed to one or more users for various uses, such as a licensed radio frequency spectrum band usable for LTE/LTE-A communications) or a shared radio frequency spectrum band (e.g., a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner)). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum by providing a detectable energy on the shared radio frequency spectrum band. The CUBS may also serve to identify the transmitting apparatus or serve to synchronize the transmitting apparatus and a receiving apparatus.

Figure 2:
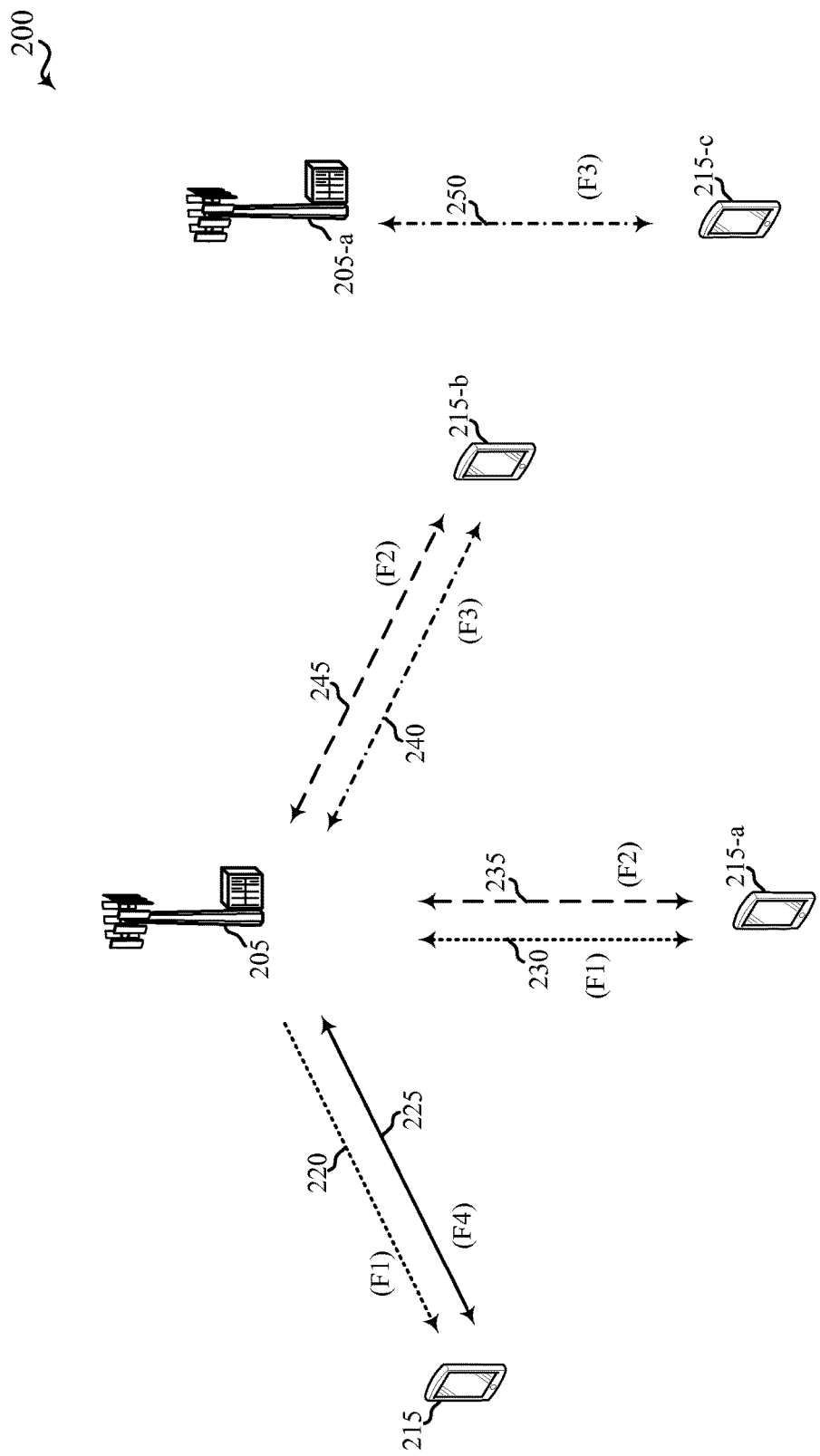
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a shared downlink mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
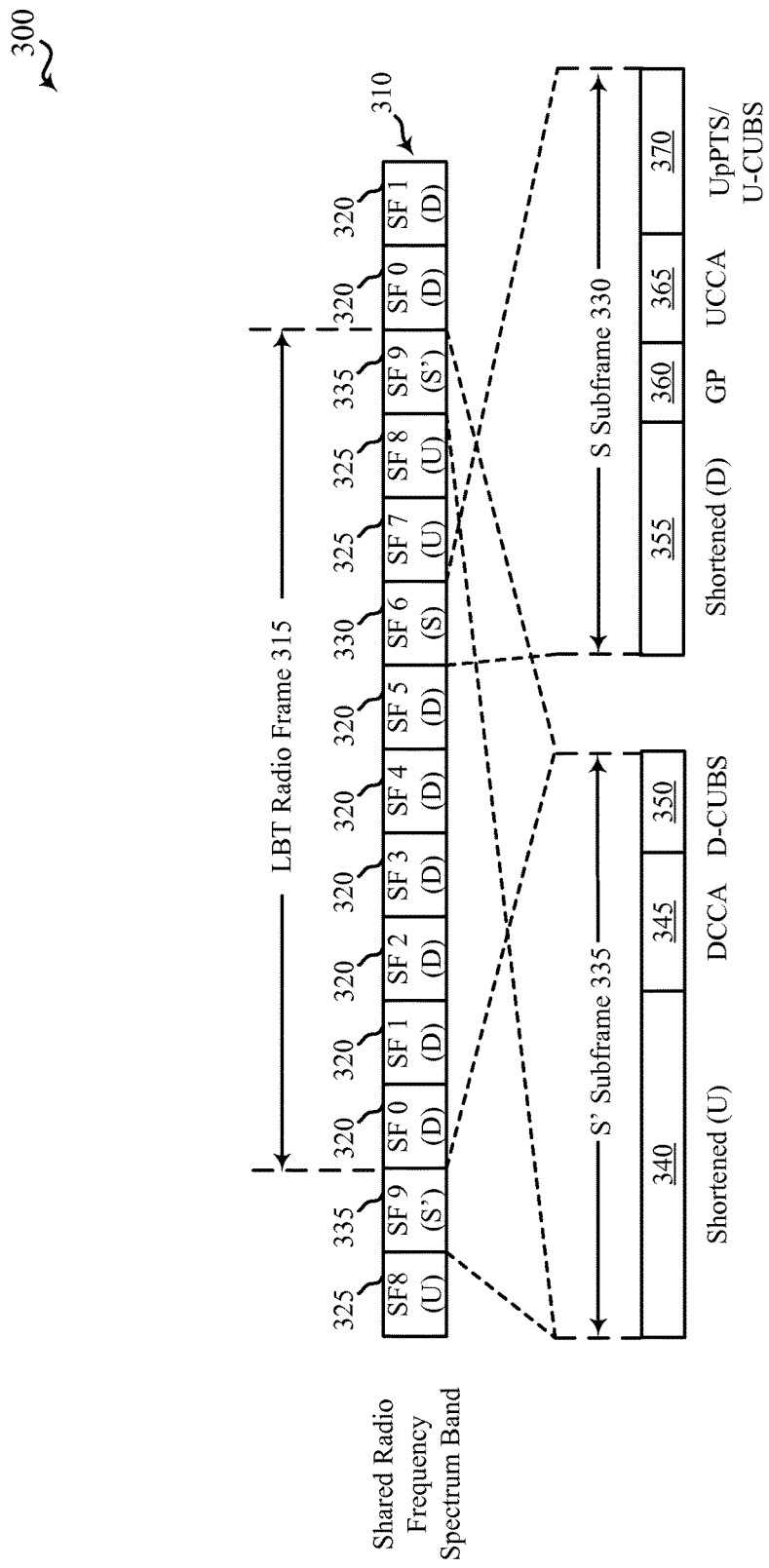
FIG. 3 shows an example of a wireless communication over a shared radio frequency spectrum band, in accordance with various aspects of the present disclosure.

FIG. 3 shows an example 300 of a wireless communication 310 over a shared radio frequency spectrum band, in accordance with various aspects of the present disclosure. In some examples, the wireless communication 310 may include a transmission of one or more uplink component carriers, which uplink component carrier(s) may be transmitted, for example, as part of a transmission made according to the supplemental downlink mode, the carrier aggregation mode, or the standalone mode described with reference to FIG. 2, the carrier aggregation mode described with reference to FIG. 4, and/or the dual-connectivity mode described with referenced to FIG. 5.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the shared radio frequency spectrum band over which the wireless communication 310 occurs. Following a successful DCCA procedure 345 by a base station, the base station may transmit a CUBS (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS 350 may in some examples take a form similar to that of an LTE/LTE-A common reference signal (CRS) or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum band to transmit the D-CUBS 350.

During the S subframe 330, an uplink CCA (UCCA) procedure 365 may be performed by one or more UEs, such as one or more of the UEs 115, 215, 215-a, 215-b, or 215-c described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures.

Figure 4:
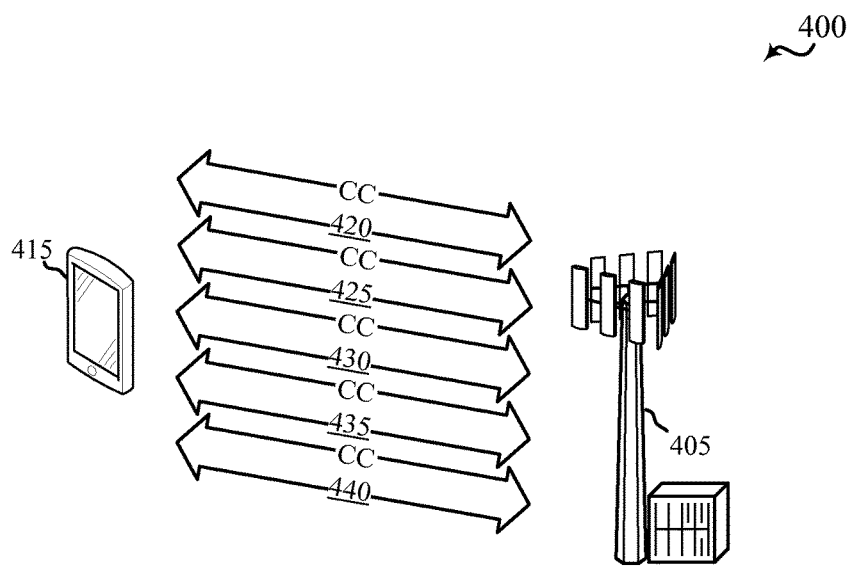
FIG. 4 shows a wireless communication system in which LTE/LTE-A may be deployed in a carrier aggregation scenario, in accordance with various aspects of the present disclosure.

FIG. 4 shows a wireless communication system 400 in which LTE/LTE-A may be deployed in a carrier aggregation scenario, in accordance with various aspects of the present disclosure. The wireless communication system 400 may be an example of portions of the wireless communication system 100 or 200 described with reference to FIG. 1 or 2. Moreover, a base station 405 may be an example of aspects of one or more of the base stations 105, 204, or 205-a described with reference to FIG. 1 or 2, while a UE 415 may be an examples of aspects of one or more of the UEs 115, 215, 215-a, 215-b, or 215-c described with reference to FIG. 1 or 2.

When communicating in a carrier aggregation mode using LTE/LTE-A communications, the UE 415 may communicate with the base station 405 using up to five CCs. One of the CCs may be designated as a primary CC, and the remaining CCs may be designated as secondary CCs. Each CC may be configured as a DL CC, a UL CC, or a cell (e.g., a CC that may be configured for use as a DL CC and/or a UL CC). By way of example, FIG. 4 illustrates communication between the UE 415 and the base station 405 over five CCs, including a first CC 420, a second CC 425, a third CC 430, a fourth CC 435, and a fifth CC 440. Each of the first CC 420, the second CC 425, the third CC 430, the fourth CC 435, and the fifth CC 440 may operate in a dedicated radio frequency spectrum band or a shared radio frequency spectrum band, depending on how the CC is allocated or configured.

When the UE 415 is configured for operation in a supplemental downlink mode of operation using a shared radio frequency spectrum band, as described with reference to FIG. 2, and when the UE 415 is operating in a carrier aggregation mode, one or more of the first CC 420, the second CC 425, the third CC 430, the fourth CC 435, or the fifth CC 440 may operate as a UL CC or a DL CC in the dedicated radio frequency spectrum band, and one or more of the first CC 420, the second CC 425, the third CC 430, the fourth CC 435, or the fifth CC 440 may operate as a DL CC in the shared radio frequency spectrum band.

When the UE 415 is configured for operation in a carrier aggregation mode of operation using the shared radio frequency spectrum band, as described with reference to FIG. 2, one or more of the first CC 420, the second CC 425, the third CC 430, the fourth CC 435, or the fifth CC 440 may operate as a UL CC or a DL CC in the dedicated radio frequency spectrum band, and one or more of the first CC 420, the second CC 425, the third CC 430, the fourth CC 435, or the fifth CC 440 may operate as a DL CC or a UL CC in the shared radio frequency spectrum band. In some examples, all of the DL CCs may operate in the dedicated radio frequency spectrum band, or all of the UL CCs may operate in the shared radio frequency spectrum band, but not all of the DL CCs and all of the UL CCs may operate in the shared radio frequency spectrum band (e.g., at least one DL CC or at least UL CC operates in the dedicated radio frequency spectrum band).

When the UE 415 is configured for operation in a stand-alone mode of operation using the shared radio frequency spectrum band, as described with reference to FIG. 2, and when the UE 415 is operating in a carrier aggregation mode, each of the first CC 420, the second CC 425, the third CC 430, the fourth CC 435, and the fifth CC 440 may operate in the shared radio frequency spectrum band.

Figure 5:
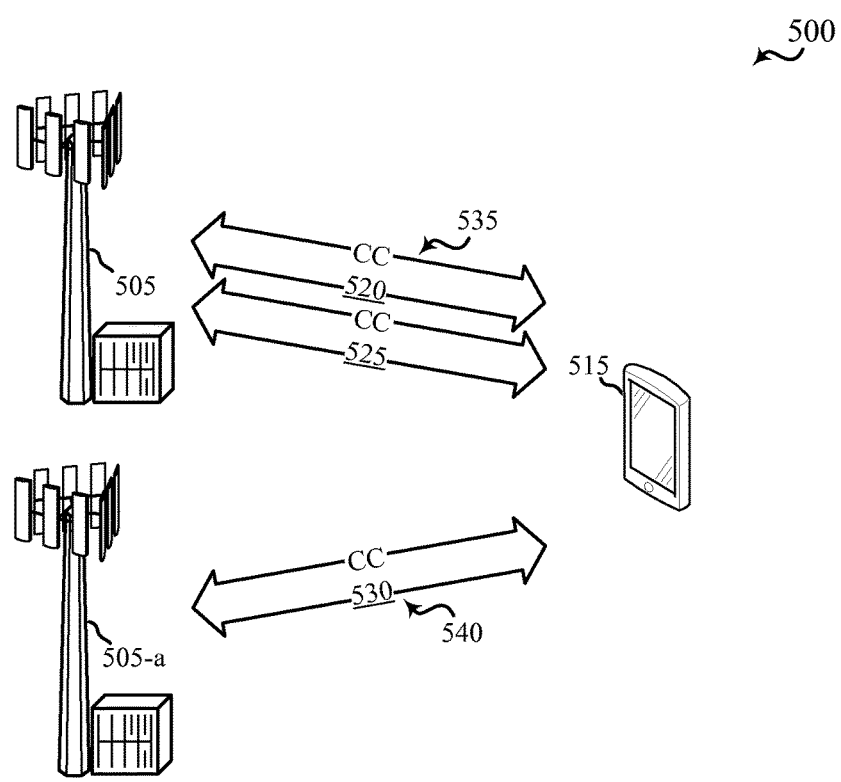
FIG. 5 shows a wireless communication system in which LTE/LTE-A may be deployed in a dual-connectivity scenario (e.g., a coordinated multipoint (CoMP) scenario), in accordance with various aspects of the present disclosure.

FIG. 5 shows a wireless communication system 500 in which LTE/LTE-A may be deployed in a dual-connectivity scenario (e.g., a coordinated multipoint (CoMP) scenario), in accordance with various aspects of the present disclosure. The wireless communication system 500 may be an example of portions of the wireless communication system 100, 200, or 400 described with reference to FIG. 1, 2, or 4. Moreover, a first base station 505 and a second base station 505-a may be examples of aspects of one or more of the base stations 105, 205, 205-a, or 405 described with reference to FIG. 1, 2, or 4, while a UE 515 may be an examples of aspects of one or more of the UEs 115, 215, 215-a, 215-b, 215-c, or 415 described with reference to FIG. 1, 2, or 4.

When communicating in a dual-connectivity mode using LTE/LTE-A communications, the UE 515 may communicate with multiple base stations, such as the first base station 505 and the second base station 505-a, using up to five CCs. One of the CCs may be designated as a primary CC, and the remaining CCs may be designated as secondary CCs. Each CC may be configured as a DL CC, a UL CC, or a cell (e.g., a CC that may be configured for use as a DL CC and/or a UL CC). By way of example, FIG. 5 illustrates communication between the UE 515 and the base station 505 over three CCs, including a first CC 520, a second CC 525, and a third CC 530. In some examples, the first CC 520 and the second CC 525 (in communication with the first base station 505) may be configured as a primary group of CCs 535 in a dual-connectivity operation, and the third CC 530 (in communication with the second base station 505-a) may be configured as a secondary group of CCs 540 in the dual-connectivity operation. The first CC 520, the second CC 525, and the third CC 530 may be configured for various modes of operation using a dedicated radio frequency spectrum band or a shared radio frequency spectrum band, similarly to how component carriers may be used in a carrier aggregation mode of operation, as described, for example, with reference to FIG. 4.

When a UE transmits to a base station over a set of UL CCs in a dedicated radio frequency spectrum band usable for LTE/LTE-A communications (e.g., in accordance with an uplink carrier aggregation operation or a dual-connectivity operation), the UE may be limited, during a subframe, to transmitting UCI over one of the UL CCs in the dedicated radio frequency spectrum band. For example, when a UE is not configured for parallel PUCCH and PUSCH transmissions during a subframe, and a PUSCH transmission is unavailable during the subframe, the UE may transmit UCI on a PUCCH CC. When a UE is configured for parallel PUCCH and PUSCH transmissions during a subframe, and a PUSCH transmission is available during the subframe, the UE may transmit UCI on a PUSCH CC. When aperiodic CSI is triggered to be transmitted on a PUSCH during the subframe, a PUSCH CC on which the aperiodic CSI is triggered to be transmitted may be selected for transmission of the UCI. LTE/LTE-A standards specify that aperiodic CSI may be triggered to be transmitted on one PUSCH CC during a subframe. When aperiodic CSI is not triggered to be transmitted on a PUSCH during the subframe, a PUSCH CC having a lowest CC index may be selected for transmission of the UCI. When a UE is configured for parallel PUCCH and PUSCH transmissions during a subframe, and a PUSCH transmission is unavailable during the subframe, the UE may transmit UCI on a PUCCH CC. When a UE is configured for parallel PUCCH and PUSCH transmissions during a subframe, and a PUSCH transmission is available during the subframe, the UE may transmit UCI on a PUCCH CC or a PUSCH CC. For example, when the UCI is an SR, or an ACK/NAK, or an SR and an ACK/NAK, or periodic CSI, the UCI may be transmitted on a PUCCH CC. As another example, when the UCI includes periodic CSI and at least one of: an SR, an ACK/NAK, or a combination of the SR and the ACK/NAK, the periodic CSI may be transmitted on a PUSCH CC, and the remainder of the UCI may be transmitted on a PUCCH CC. When more than one PUSCH CC is available to transmit the periodic CSI, a PUSCH CC may be selected based on whether aperiodic CSI is triggered to be transmitted or based on CC index.

As previously mentioned, LTE/LTE-A standards specify that aperiodic CSI may be triggered to be transmitted on one PUSCH CC during a subframe. When a UE operates in a carrier aggregation mode, aperiodic CSI may be triggered in downlink control information (DCI) via a 2-bit information field (except when DCI is transmitted in a common search space (CSS), in which a 1-bit information field is defined, with a setting of "1" triggering a CSI report for the CC that carries the CSS).

When CoMP is not used during a subframe, the values of the 2-bit information field for triggering a transmission of aperiodic CSI on a serving cell (c) are defined as:
  00 No aperiodic CSI report is triggered.
  01 An aperiodic CSI report is triggered for serving cell c.
  10 An aperiodic CSI report is triggered for a first set of serving cells configured by higher layers.
  11 An aperiodic CSI report is triggered for a second set of serving cells configured by higher layers.

When CoMP is used during a subframe, the values of the 2-bit information field for triggering a transmission of aperiodic CSI on a serving cell (c) are defined as:
  00 No aperiodic CSI report is triggered.
  01 An aperiodic CSI report is triggered for a set of CSI processes configured by higher layers for serving cell c.
  10 An aperiodic CSI report is triggered for a first set of CSI processes configured by higher layers.
  11 An aperiodic CSI report is triggered for a second set of CSI processes configured by higher layers.

When dynamic TDD configuration is supported and there are two CSI subframe sets configured for a UE, the values of the 2-bit information field for triggering a transmission of aperiodic CSI on a serving cell (c) are defined as:
  00 No aperiodic CSI report is triggered.
  01 An aperiodic CSI report is triggered for a set of CSI processes, and/or CSI process, CSI subframe set pairs, configured by higher layers for serving cell c.
  10 An aperiodic CSI report is triggered for a first set of CSI processes, and/or CSI process, CSI subframe set pairs, configured by higher layers.
  11 An aperiodic CSI report is triggered for a second set of CSI processes, and/or CSI process, CSI subframe set pairs, configured by higher layers.

As described above, the factor(s) used for selecting a UL CC for transmission of UCI in a dedicated radio frequency spectrum band usable for LTE/LTE-A communications, during a subframe, may depend on factors such as whether a UE is configured for parallel PUCCH and PUSCH transmissions during the subframe, whether a PUSCH is available during the subframe, or the type of UCI to be transmitted during the subframe. When selecting a UL CC for transmission of UCI over a UL CC selected from a set of UL CCs including at least one UL CC in a dedicated radio frequency spectrum band and at least one UL CC in a shared radio frequency spectrum band, other or different factors may be used to select a UL CC for transmitting UCI during a subframe. These other or different factors may include, for example, limiting the transmission of UCI to a UL CC in the dedicated radio frequency spectrum band, or allowing the transmission of just some types of UCI over a UL CC in the shared radio frequency spectrum band.

Figure 6:
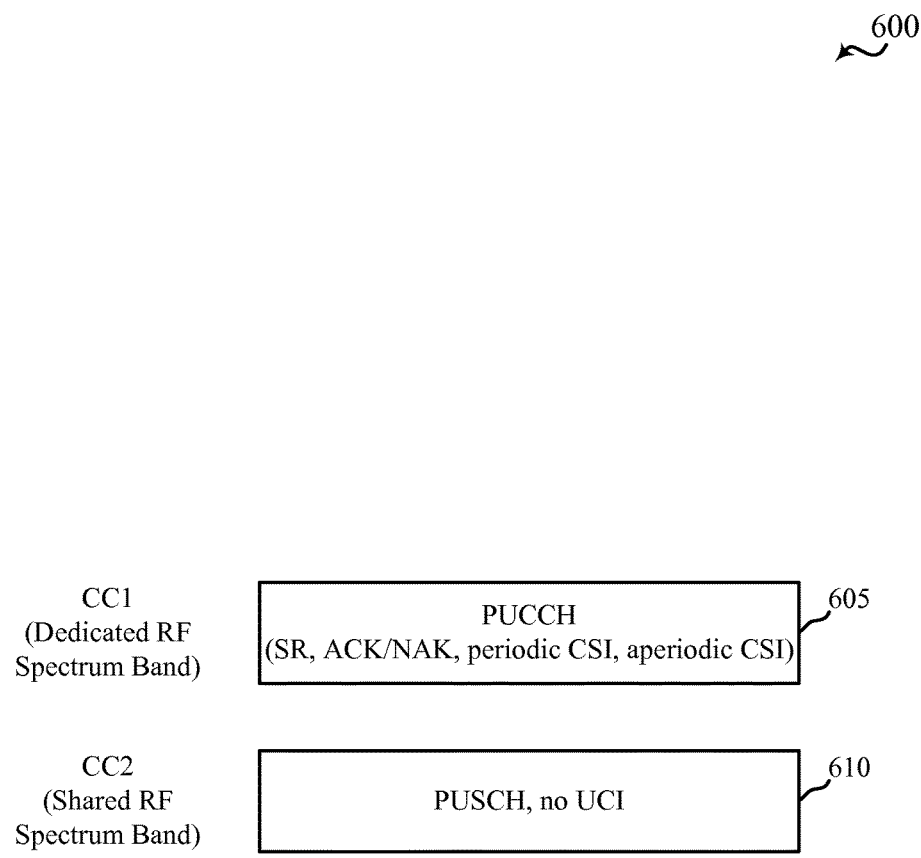
FIG. 6 shows an exemplary set of UL CCs including at least one UL CC in a dedicated radio frequency spectrum band and at least one UL CC in a shared radio frequency spectrum band, in accordance with various aspects of the present disclosure.

FIG. 6 shows an exemplary set of UL CCs 600 including at least one UL CC in a dedicated radio frequency spectrum band and at least one UL CC in a shared radio frequency spectrum band, in accordance with various aspects of the present disclosure. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the set of UL CCs 600 may be used by a UE such as one of the UEs 115, 215, 215-a, 215-b, 215-c, 415, or 515 described with reference to FIG. 1, 2, 4, or 5. In some examples, the set of UL CCs 600 may be used for an uplink carrier aggregation operation as described with reference to FIG. 4, or for a dual-connectivity operation as described with reference to FIG. 5 (e.g., as a primary group of CCs or a secondary group of CCs in the dual-connectivity operation).

By way of example, the set of UL CCs 600 may include a first UL CC 605 (CC1) in the dedicated radio frequency spectrum band, and a second UL CC 610 (CC2) in the shared radio frequency spectrum band. By way of further example, a PUSCH transmission may be unavailable in the dedicated radio frequency spectrum band during the subframe. In such an example, the transmission of UCI for the set of UL CCs 600 may be limited to a PUCCH CC in the dedicated radio frequency spectrum band (e.g., the first UL CC 605). Although FIG. 6 illustrates a transmission of a PUSCH on the second UL CC 610, there may be no transmission of UCI on the second UL CC 610. Any UCI for the second UL CC 610 may be transmitted on the first UL CC 605. In this manner, the transmission of UCI is limited to the dedicated radio frequency spectrum band. The UCI transmitted on the PUCCH CC in the dedicated radio frequency spectrum band (e.g., the first UL CC 605) may include, when available, one or more of a scheduling request (SR), an acknowledgement (ACK)/non-acknowledgement (NAK), periodic channel state information (CSI), or aperiodic CSI.

Figure 7A:
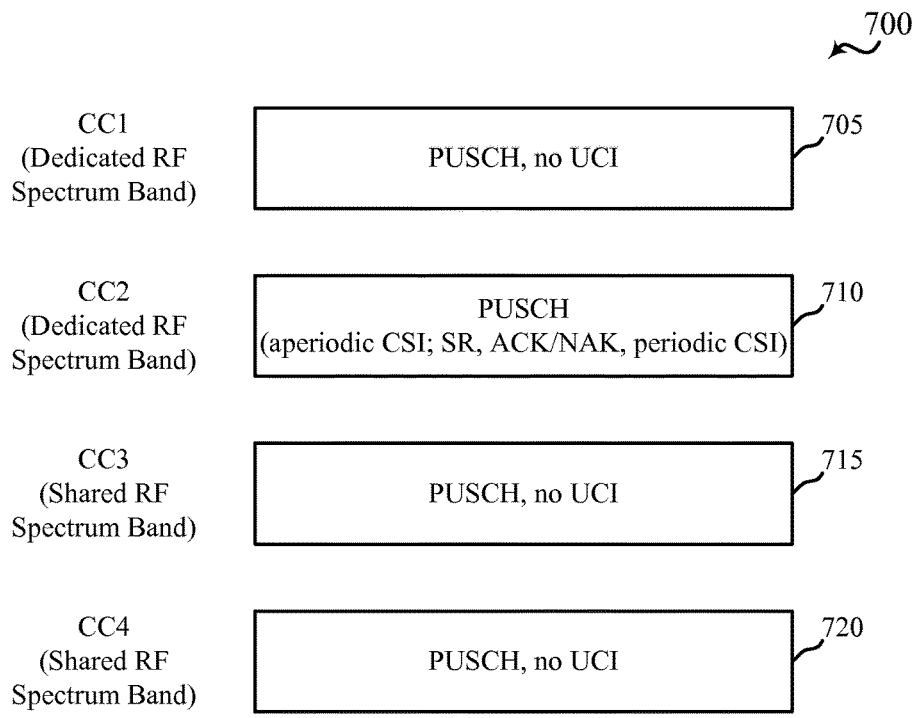
FIG. 7A shows an exemplary set of UL CCs including at least one UL CC in a dedicated radio frequency spectrum band and at least one UL CC in a shared radio frequency spectrum band, in accordance with various aspects of the present disclosure.

FIG. 7A shows an exemplary set of UL CCs 700 including at least one UL CC in a dedicated radio frequency spectrum band and at least one UL CC in a shared radio frequency spectrum band, in accordance with various aspects of the present disclosure. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the set of UL CCs 700 may be used by a UE such as one of the UEs 115, 215, 215-a, 215-b, 215-c, 415, or 515 described with reference to FIG. 1, 2, 4, or 5. In some examples, the set of UL CCs 700 may be used for an uplink carrier aggregation operation as described with reference to FIG. 4, or for a dual-connectivity operation as described with reference to FIG. 5 (e.g., as a primary group of CCs or a secondary group of CCs in the dual-connectivity operation).

By way of example, the set of UL CCs 700 may include a first UL CC 705 (CC1) in the dedicated radio frequency spectrum band, a second UL CC 710 (CC2) in the dedicated radio frequency spectrum band, a third UL CC 715 (CC3) in the shared radio frequency spectrum band, and a fourth UL CC 720 (CC4) in the shared radio frequency spectrum band. By way of further example, a UE transmitting on the first UL CC 705, the second UL CC 710, the third UL CC 715, and the fourth UL CC 720 may not be configured for parallel PUCCH and PUSCH transmissions during a subframe, and a PUSCH transmission may be available in the dedicated radio frequency spectrum band during the subframe. In such an example, the transmission of UCI for the set of UL CCs 700 may be limited to a PUSCH CC in the dedicated radio frequency spectrum band (e.g., the second UL CC 710). Although FIG. 7A illustrates a transmission of a PUSCH on each of the first UL CC 705, the third UL CC 715, and the fourth UL CC 720, there may be no transmission of UCI on the first UL CC 705, the third UL CC 715, or the fourth UL CC 720. Any UCI for the first UL CC 705, the third UL CC 715, or the fourth UL CC 720 may be transmitted on the second UL CC 710. In this manner, the transmission of UCI is limited to the dedicated radio frequency spectrum band. The UCI transmitted on the PUSCH CC in the dedicated radio frequency spectrum band (e.g., the second UL CC 710) may include, when available, one or more of an SR, an ACK/NAK, periodic CSI, or aperiodic CSI.

In FIG. 7A, the second UL CC 710 may be selected over the first UL CC 705, for transmitting UCI during the subframe, based at least in part on a determination that aperiodic CSI has been triggered to be transmitted on the second UL CC 710, but not the first UL CC 705, during the subframe.

Figure 7B:
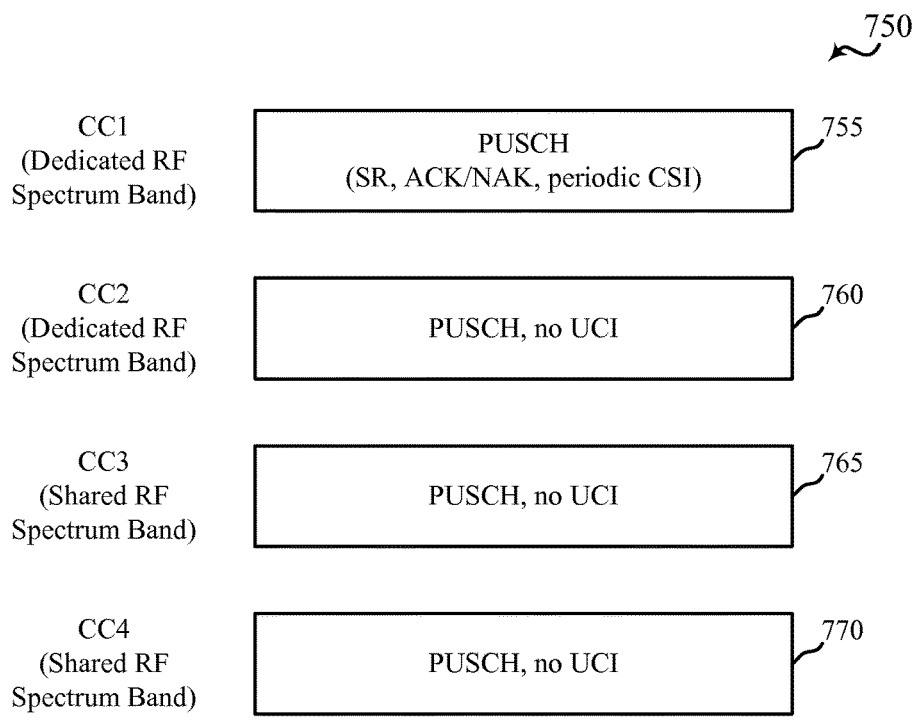
FIG. 7B shows an exemplary set of UL CCs including at least one UL CC in a dedicated radio frequency spectrum band and at least one UL CC in a shared radio frequency spectrum band, in accordance with various aspects of the present disclosure.

FIG. 7B shows an exemplary set of UL CCs 750 including at least one UL CC in a dedicated radio frequency spectrum band and at least one UL CC in a shared radio frequency spectrum band, in accordance with various aspects of the present disclosure. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the set of UL CCs 750 may be used by a UE such as one of the UEs 115, 215, 215-a, 215-b, 215-c, 415, or 515 described with reference to FIG. 1, 2, 4, or 5. In some examples, the set of UL CCs 750 may be used for an uplink carrier aggregation operation as described with reference to FIG. 4, or for a dual-connectivity operation as described with reference to FIG. 5 (e.g., as a primary group of CCs or a secondary group of CCs in the dual-connectivity operation).

By way of example, the set of UL CCs 750 may include a first UL CC 755 (CC1) in the dedicated radio frequency spectrum band, a second UL CC 760 (CC2) in the dedicated radio frequency spectrum band, a third UL CC 765 (CC3) in the shared radio frequency spectrum band, and a fourth UL CC 770 (CC4) in the shared radio frequency spectrum band. By way of further example, a UE transmitting on the first UL CC 755, the second UL CC 760, the third UL CC 765, and the fourth UL CC 770 may not be configured for parallel PUCCH and PUSCH transmissions during a subframe, and a PUSCH transmission may be available in the dedicated radio frequency spectrum band during the subframe. In such an example, the transmission of UCI for the set of UL CCs 750 may be limited to a PUSCH CC in the dedicated radio frequency spectrum band (e.g., the first UL CC 755). Although FIG. 7B illustrates a transmission of a PUSCH on each of the second UL CC 760, the third UL CC 765, and the fourth UL CC 770, there may be no transmission of UCI on the second UL CC 760, the third UL CC 765, or the fourth UL CC 770. Any UCI for the second UL CC 760, the third UL CC 765, or the fourth UL CC 770 may be transmitted on the first UL CC 755. In this manner, the transmission of UCI is limited to the dedicated radio frequency spectrum band. The UCI transmitted on the PUSCH CC in the dedicated radio frequency spectrum band (e.g., the first UL CC 755) may include, when available, one or more of an SR, an ACK/NAK, or periodic CSI.

In FIG. 7B, the first UL CC 755 may be selected over the second UL CC 760, for transmitting UCI during the subframe, based at least in part on a determination that aperiodic CSI has not been triggered to be transmitted on the first UL CC 755 or the second UL CC 760, and based at least in part on a first CC index associated with the first UL CC 755. For example, the first UL CC 755 may be selected based at least in part on the first CC index associated with the first UL CC 755 being lower than a second CC index associated with the second UL CC 760.

Figure 8A:
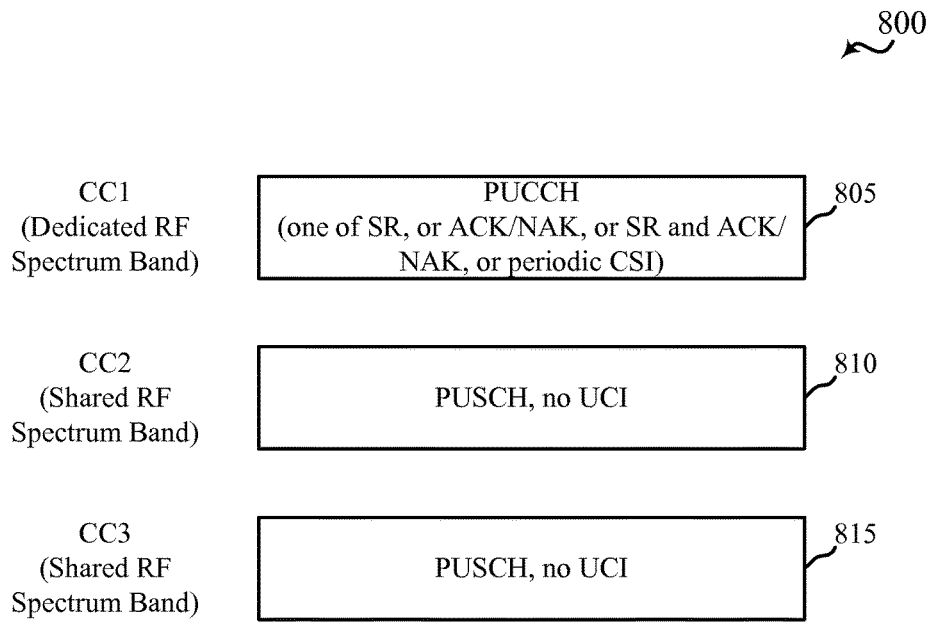
FIG. 8A shows an exemplary set of UL CCs including at least one UL CC in a dedicated radio frequency spectrum band and at least one UL CC in a shared radio frequency spectrum band, in accordance with various aspects of the present disclosure.

FIG. 8A shows an exemplary set of UL CCs 800 including at least one UL CC in a dedicated radio frequency spectrum band and at least one UL CC in a shared radio frequency spectrum band, in accordance with various aspects of the present disclosure. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the set of UL CCs 800 may be used by a UE such as one of the UEs 115, 215, 215-*a*, 215-*b*, 215-*c*, 415, or 515 described with reference to FIG. 1, 2, 4, or 5. In some examples, the set of UL CCs 800 may be used for an uplink carrier aggregation operation as described with reference to FIG. 4, or for a dual-connectivity operation as described with reference to FIG. 5 (e.g., as a primary group of CCs or a secondary group of CCs in the dual-connectivity operation).

By way of example, the set of UL CCs 800 may include a first UL CC 805 (CC1) in the dedicated radio frequency spectrum band, a second UL CC 810 (CC2) in the shared radio frequency spectrum band, and a third UL CC 815 (CC3) in the shared radio frequency spectrum band. By way of further example, a UE transmitting on the first UL CC 805, the second UL CC 810, and the third UL CC 815 may or may not be configured for parallel PUCCH and PUSCH transmissions during a subframe, and a PUSCH transmission may be available in the dedicated radio frequency spectrum band during the subframe. When the UE is not configured for parallel PUCCH and PUSCH transmissions during the subframe, the UE may still be allowed to transmit a PUCCH in the dedicated radio frequency spectrum band and a PUSCH in the shared radio frequency spectrum band, in order to transmit UCI in the dedicated radio frequency spectrum band during the subframe. Also by way of example, UCI to be transmitted during the subframe may include one of an SR, or an ACK/NAK, or an SR and an ACK/NAK, or periodic CSI. In such an example, the transmission of UCI for the set of UL CCs 800 may be limited to a PUCCH CC in the dedicated radio frequency spectrum band (e.g., the first UL CC 805). Although FIG. 8A illustrates a transmission of a PUSCH on each of the second UL CC 810 and the third UL CC 815, there may be no transmission of UCI on the second UL CC 810 and the third UL CC 815. Any UCI for the second UL CC 810 and the third UL CC 815 may be transmitted on the PUCCH CC in the dedicated radio frequency spectrum band (e.g., the first UL CC 805). In this manner, the transmission of UCI is limited to the dedicated radio frequency spectrum band.

Figure 8B:
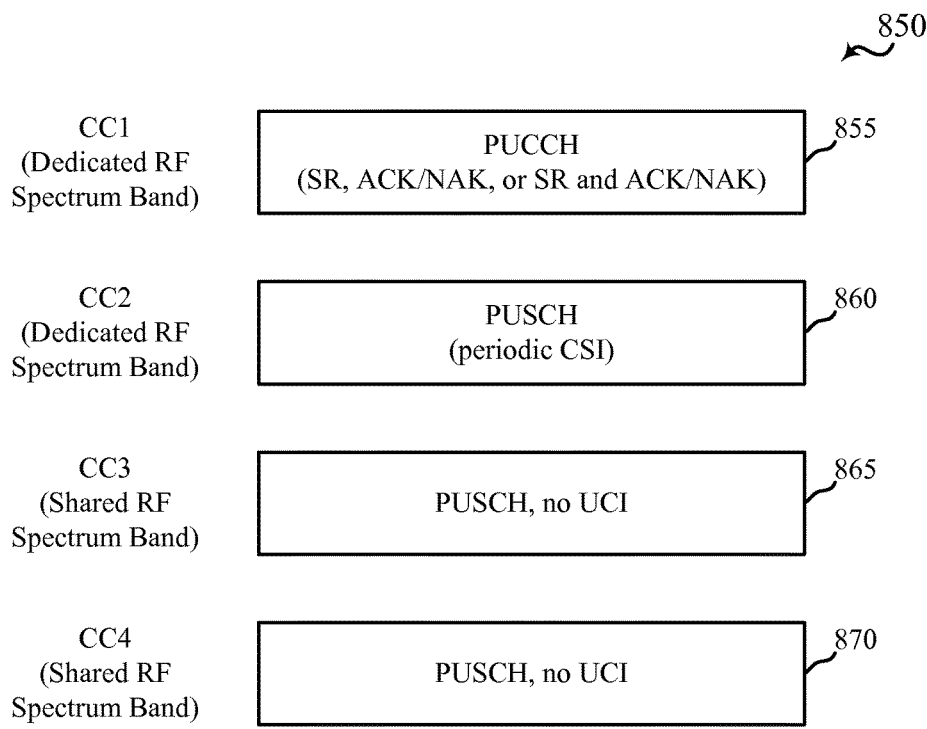
FIG. 8B shows an exemplary set of UL CCs including at least one UL CC in a dedicated radio frequency spectrum band and at least one UL CC in a shared radio frequency spectrum band, in accordance with various aspects of the present disclosure.

FIG. 8B shows an exemplary set of UL CCs 850 including at least one UL CC in a dedicated radio frequency spectrum band and at least one UL CC in a shared radio frequency spectrum band, in accordance with various aspects of the present disclosure. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the set of UL CCs 850 may be used by a UE such as one of the UEs 115, 215, 215-*a*, 215-*b*, 215-*c*, 415, or 515 described with reference to FIG. 1, 2, 4, or 5. In some examples, the set of UL CCs 850 may be used for an uplink carrier aggregation operation as described with reference to FIG. 4, or for a dual-connectivity operation as described with reference to FIG. 5 (e.g., as a primary group of CCs or a secondary group of CCs in the dual-connectivity operation).

By way of example, the set of UL CCs 850 may include a first UL CC 855 (CC1) in the dedicated radio frequency spectrum band, a second UL CC 860 (CC2) in the dedicated radio frequency spectrum band, a third UL CC 865 (CC3) in the shared radio frequency spectrum band, and a fourth UL CC 870 (CC4) in the shared radio frequency spectrum band. By way of further example, a UE transmitting on the first UL CC 855, the second UL CC 860, the third UL CC 865, and the fourth UL CC 870 may or may not be configured for parallel PUCCH and PUSCH transmissions during a subframe, and a PUSCH transmission may be available in the dedicated radio frequency spectrum band during the subframe. When the UE is not configured for parallel PUCCH and PUSCH transmissions during the subframe, the UE may still be allowed to transmit a PUCCH in the dedicated radio frequency spectrum band and a PUSCH in the shared radio frequency spectrum band, in order to transmit UCI in the dedicated radio frequency spectrum band during the subframe. Also by way of example, UCI to be transmitted during the subframe may include periodic CSI and at least one of: an SR, an ACK/NAK, or a combination of the SR and the ACK/NAK. In such an example, the transmission of UCI for the set of UL CCs 850 may be limited to transmission of a first portion of the UCI on a PUCCH CC in the dedicated radio frequency spectrum band (e.g., the first UL CC 855), and transmission of a second portion of the UCI on a PUSCH CC in the dedicated radio frequency spectrum band (e.g., the second UL CC 860). In some examples, the first portion of the UCI may include the periodic CSI, and the second portion of the UCI may include the SR, the ACK/NAK, or the combination of the SR and the ACK/NAK. Although FIG. 8B illustrates a transmission of a PUSCH on each of the third UL CC 865 and the fourth UL CC 870, there may be no transmission of UCI on the third UL CC 865 and the fourth UL CC 870. Any UCI for the third UL CC 865 and the fourth UL CC 870 may be transmitted on the PUCCH CC or the PUSCH CC in the dedicated radio frequency spectrum band (e.g., the first UL CC 805 or the second UL CC 810), as previously described. In this manner, the transmission of UCI is limited to the dedicated radio frequency spectrum band.

Figure 9:
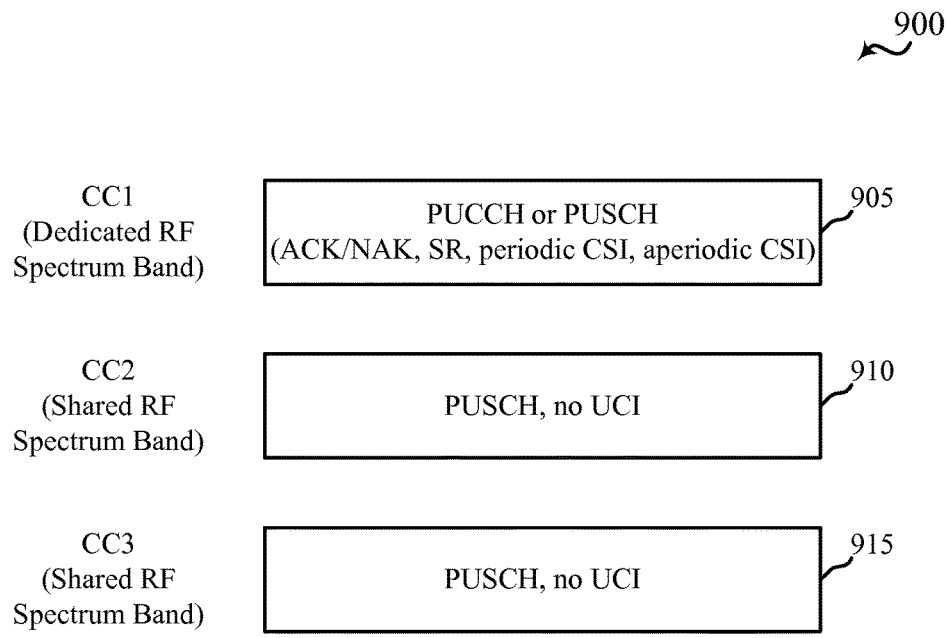
FIG. 9 shows an exemplary set of UL CCs including at least one UL CC in a dedicated radio frequency spectrum band and at least one UL CC in a shared radio frequency spectrum band, in accordance with various aspects of the present disclosure.

FIG. 9 shows an exemplary set of UL CCs 900 including at least one UL CC in a dedicated radio frequency spectrum band and at least one UL CC in a shared radio frequency spectrum band, in accordance with various aspects of the present disclosure. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the set of UL CCs 900 may be used by a UE such as one of the UEs 115, 215, 215-*a*, 215-*b*, 215-*c*, 415, or 515 described with reference to FIG. 1, 2, 4, or 5. In some examples, the set of UL CCs 900 may be used for an uplink carrier aggregation operation as described with reference to FIG. 4, or for a dual-connectivity operation as described with reference to FIG. 5 (e.g., as a primary group of CCs or a secondary group of CCs in the dual-connectivity operation).

By way of example, the set of UL CCs 900 may include a first UL CC 905 (CC1) in the dedicated radio frequency spectrum band, a second UL CC 910 (CC2) in the shared radio frequency spectrum band, and a third UL CC 915 (CC3) in the shared radio frequency spectrum band. By way of further example, UCI to be transmitted during a subframe may include aperiodic CSI. UCI may also include one or more other types of UCI. In such an example, the transmission of UCI for the set of UL CCs 900 may be limited to a PUCCH CC or PUSCH CC in the dedicated radio frequency spectrum band (e.g., the first UL CC 905). Although FIG. 9 illustrates a transmission of a PUSCH on the second UL CC 910, there may be no transmission of UCI on the second UL CC 910 or the third UL CC 915. Any UCI for the second UL CC 910 or the third UL CC 915 (e.g., ACKs/NAKs, periodic CSI, or aperiodic CSI), as well as UCI for the first UL CC 905 and any SR, if any, may be transmitted on the first UL CC 905. In this manner, the transmission of UCI is limited to the dedicated radio frequency spectrum band.

In some examples, the aperiodic CSI transmitted on the first UL CC 905 may be limited to aperiodic CSI for one UL CC in the set of UL CCs 900. In these examples, the aperiodic CSI to be transmitted may be triggered to be transmitted, and transmitted, in accordance with one of the 2-bit information field entries previously described (e.g., an entry 10 or entry 11).

Figure 10:
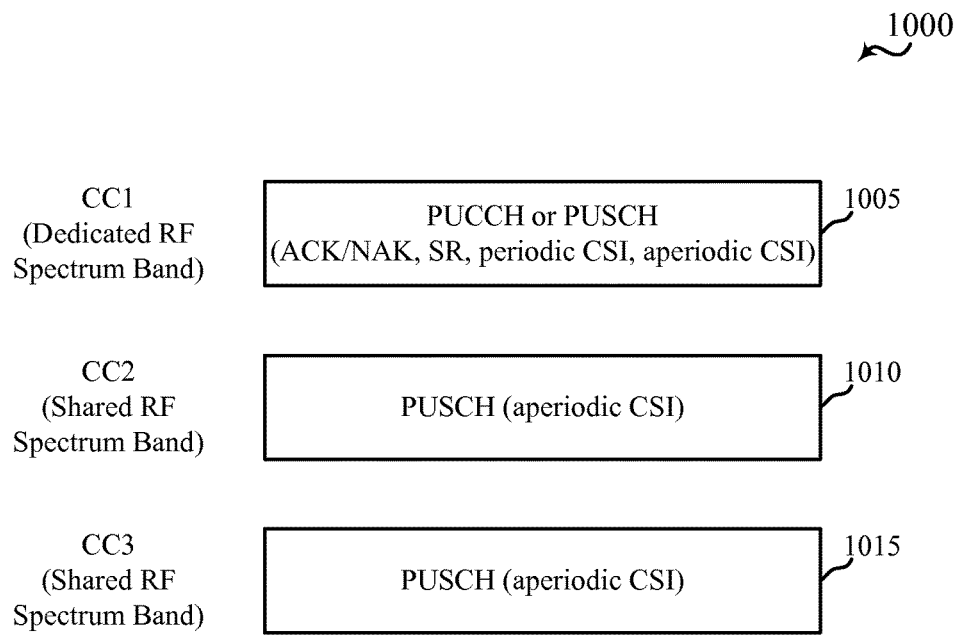
FIG. 10 shows an exemplary set of UL CCs including at least one UL CC in a dedicated radio frequency spectrum band and at least one UL CC in a shared radio frequency spectrum band, in accordance with various aspects of the present disclosure.

FIG. 10 shows an exemplary set of UL CCs 1000 including at least one UL CC in a dedicated radio frequency spectrum band and at least one UL CC in a shared radio frequency spectrum band, in accordance with various aspects of the present disclosure. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the set of UL CCs 1000 may be used by a UE such as one of the UEs 115, 215, **215-*a*, 215-*b*, 215-*c*, 415, or 515 described with reference to FIG. 1, 2, 4, or 5. In some examples, the set of UL CCs 1000 may be used for an uplink carrier aggregation operation as described with reference to FIG. 4, or for a dual-connectivity operation as described with reference to FIG. 5** (e.g., as a primary group of CCs or a secondary group of CCs in the dual-connectivity operation).

By way of example, the set of UL CCs 1000 may include a first UL CC 1005 (CC1) in the dedicated radio frequency spectrum band, a second UL CC 1010 (CC2) in the shared radio frequency spectrum band, and a third UL CC 1015 (CC3) in the shared radio frequency spectrum band. By way of further example, UCI to be transmitted during a subframe may include aperiodic CSI. UCI may also include one or more other types of UCI. In such an example, the transmission of UCI for the set of UL CCs 1000 may be limited to a PUCCH CC or a PUSCH CC in the dedicated radio frequency spectrum band (e.g., the first UL CC 1005), and to each PUSCH CC in the shared radio frequency spectrum band for which aperiodic CSI is triggered to be transmitted during the subframe. Thus, assuming that aperiodic CSI is triggered to be transmitted for each of the second UL CC 1010 and the third UL CC 1015 during the subframe, the aperiodic CSI that is triggered to be transmitted on each UL CC in the shared radio frequency spectrum band may be transmitted on its respective UL CC in the shared radio frequency spectrum band (e.g., on the second UL CC 1010 or on the third UL CC 1015). Other UCI (e.g., ACKs/NAKs or periodic CSI) for the second UL CC 1010 or the third UL CC 1015, if any, as well as any UCI for the first UL CC 1005 and any SR, may be transmitted on the first UL CC 10015 in the dedicated radio frequency spectrum band. In this manner, the transmission of all UCI but aperiodic CSI is limited to the dedicated radio frequency spectrum band, and the triggering of aperiodic CSI for more than one UL CC is enabled (although aperiodic CSI may still be transmitted for just one UL CC in the dedicated radio frequency spectrum band, as specified in current LTE/LTE-A standards). In a variant of what is described with reference to FIG. 10, periodic CSI for a UL CC in the shared radio frequency spectrum band may also or alternatively be transmitted on the UL CC for which it is generated.

Each of the examples described with reference to FIGS. 6, 7A, 7B, 8A, 8B, 9, and 10 describe a scenario in which a set of UL CCs includes at least one UL CC in a dedicated radio frequency spectrum band. In scenarios in which all of the UL CCs in the set of UL CCs are in the shared radio frequency spectrum band, each UL CC may transmit its own UCI, or a UL CC may be selected from among the set of UL CCs based at least in part on rules used to select a UL CC for transmission of UCI in accordance with LTE/LTE-A communications in a dedicated radio frequency spectrum band.

Having described various examples for limiting the transmission of UCI to a UL CC in a dedicated radio frequency spectrum band, or allowing the transmission of just some types of UCI over a UL CC in a shared radio frequency spectrum band, apparatuses for performing such transmissions in accordance with such limitations are described with reference to FIGS. 11-13.

Figure 11:
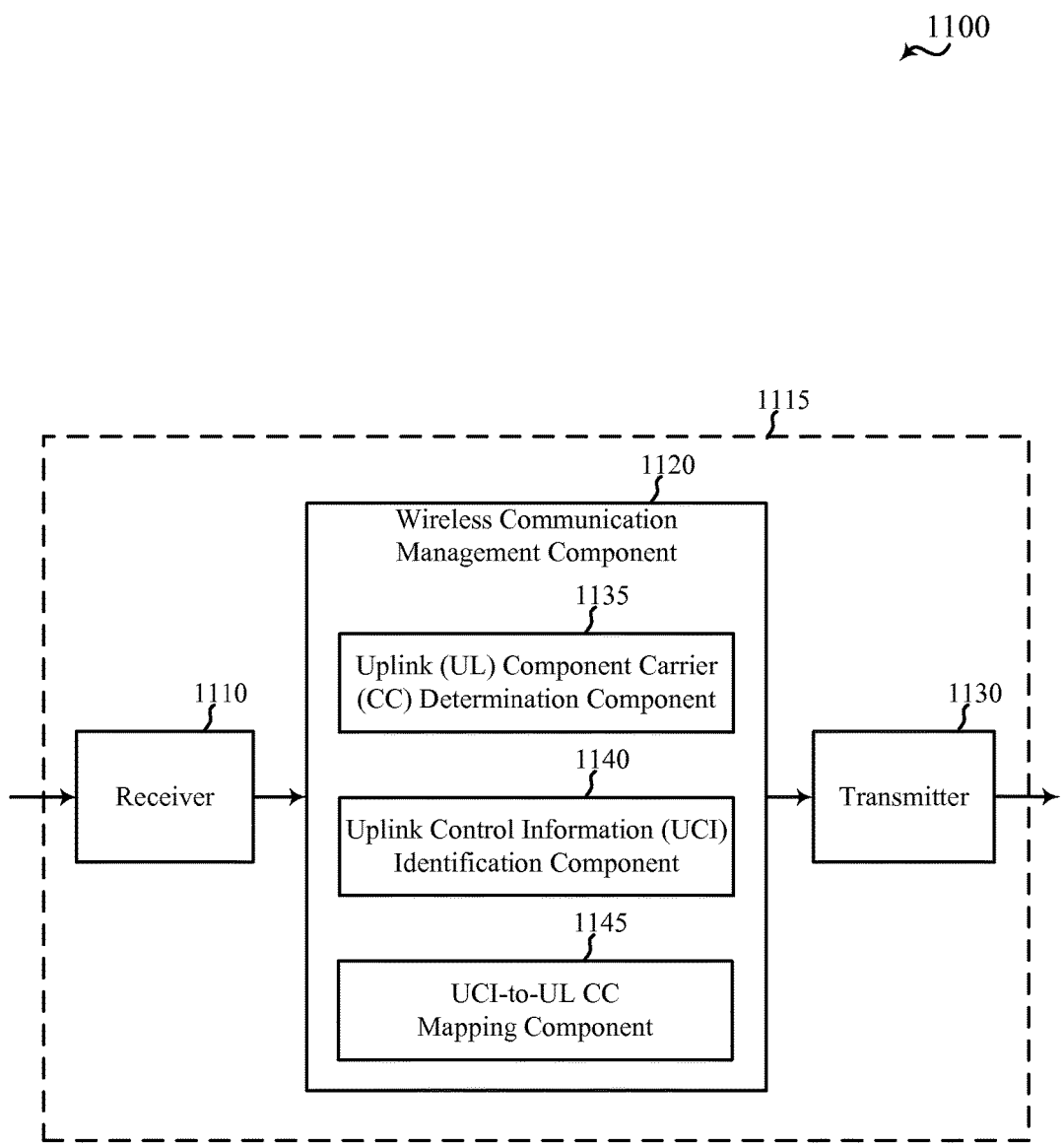
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. The apparatus 1115 may be an example of aspects of one or more of the UEs 115, 215, **215-*a*, 215-*b*, 215-*c*, 415, or 515 described with reference to FIG. 1, 2, 4, or 5. The apparatus 1115 may also be or include a processor. The apparatus 1115 may include a receiver 1110, a wireless communication management component 1120, or a transmitter 1130**. Each of these components may be in communication with each other.

The components of the apparatus 1115 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1110 may include at least one radio frequency (RF) receiver, such as at least one RF receiver operable to receive transmissions over a first radio frequency spectrum band (e.g., a dedicated radio frequency spectrum band for which transmitting apparatuses may not contend for access because the radio frequency spectrum band is licensed to one or more users for various uses, such as a licensed radio frequency spectrum band usable for LTE/LTE-A communications) or a second radio frequency spectrum band (e.g., a shared radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner)). In some examples, the first radio frequency spectrum band or the second radio frequency spectrum band may be used for LTE/LTE-A communications, as described, for example, with reference to FIG. 1, 2, 3, or 4. The receiver 1110 may be used to receive various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the first radio frequency spectrum band or the second radio frequency spectrum band.

In some examples, the transmitter 1130 may include at least one RF transmitter, such as at least one RF transmitter operable to transmit over the first radio frequency spectrum band or the second radio frequency spectrum band. The transmitter 1130 may be used to transmit various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the first radio frequency spectrum band or the second radio frequency spectrum band.

In some examples, the wireless communication management component 1120 may be used to manage one or more aspects of wireless communication for the apparatus 1115. In some examples, the wireless communication management component 1120 may include a UL CC determination component 1135, a UCI identification component 1140, or a UCI-to-UL CC mapping component 1145.

In some examples, the UL CC determination component 1135 may be used to determine a set of UL CCs to use for the apparatus 1115. The set of UL CCs may include at least one UL CC in the first radio frequency spectrum band and at least one UL CC in the second radio frequency spectrum band. In some examples, the UL CC determination component 1135 may determine the set of UL CCs for an uplink carrier aggregation operation. In some examples, the UL CC determination component 1135 may determine the set of UL CCs for a dual-connectivity operation, for use as a primary group of CCs or a secondary group of CCs in the dual-connectivity operation.

In some examples, the UCI identification component 1140 may be used to identify, for a subframe, UCI due for transmission. The UCI may be associated with one or more CCs. In some examples, the UCI may include at least one type of periodic UCI. In some examples, the UCI may include all types of periodic UCI. In some examples, the UCI may include an SR, an ACK/NAK, or periodic CSI. In some examples, the UCI may include aperiodic CSI. In some examples, the UCI may include all types of UCI.

In some examples, the UCI-to-UL CC mapping component 1145 may be used to limit available UL CCs for transmission of the UCI to the at least one UL CC in the first radio frequency spectrum band.

When the set of UL CCs to use for the apparatus 1115 includes two or more UL CCs in the first radio frequency spectrum band, and in some examples, a UL CC used for transmitting UCI may be selected by the UCI-to-UL CC mapping component 1145 from among the two or more UL CCs in the first radio frequency spectrum band, based at least in part on rules used to select a UL CC for transmission of UCI in accordance with LTE/LTE-A communications in a dedicated radio frequency spectrum band.

Figure 12:
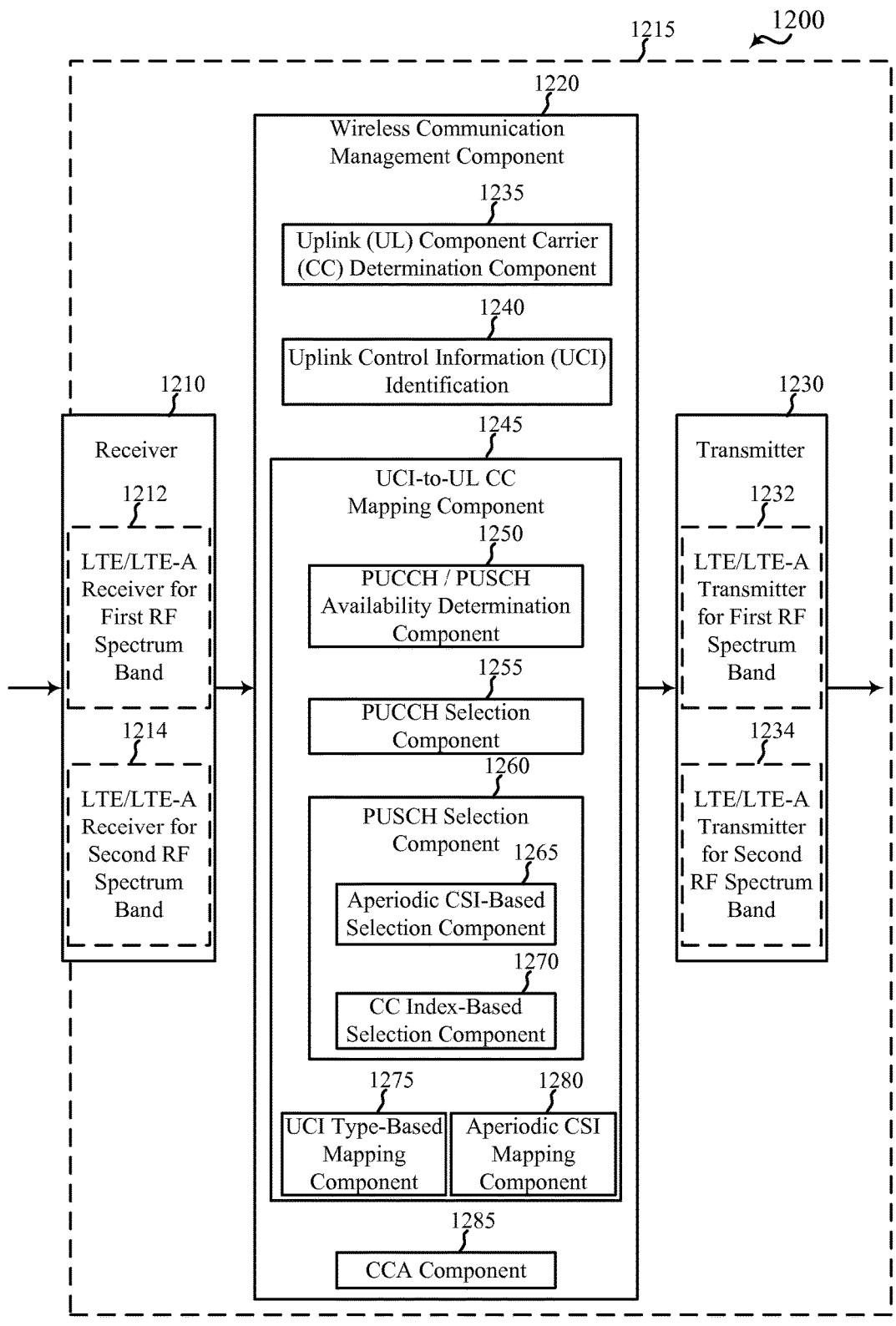
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. The apparatus 1215 may be an example of aspects of one or more of the UEs 115, 215, 215-*a*, 215-*b*, 215-*c*, 415, or 515 described with reference to FIG. 1, 2, 4, or 5, or aspects of the apparatus 1115 described with reference to FIG. 11. The apparatus 1215 may also be or include a processor. The apparatus 1215 may include a receiver 1210, a wireless communication management component 1220, or a transmitter 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1210 may include at least one RF receiver, such as at least one RF receiver operable to receive transmissions over a first radio frequency spectrum band (e.g., a dedicated radio frequency spectrum band for which transmitting apparatuses may not contend for access because the radio frequency spectrum band is licensed to one or more users for various uses, such as a licensed radio frequency spectrum band usable for LTE/LTE-A communications) or a second radio frequency spectrum band (e.g., a shared radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner)).

In some examples, the first radio frequency spectrum band or the second radio frequency spectrum band may be used for LTE/LTE-A communications, as described, for example, with reference to FIG. 1, 2, 3, or 4. The receiver 1210 may in some cases include separate receivers for the first radio frequency spectrum band and the second radio frequency spectrum band. The separate receivers may, in some examples, take the form of an LTE/LTE-A receiver for communicating over the first radio frequency spectrum band (e.g., LTE/LTE-A receiver for first RF spectrum band 1212), and an LTE/LTE-A receiver for communicating over the second radio frequency spectrum band (e.g., LTE/LTE-A receiver for second RF spectrum band 1214). The receiver 1210, including the LTE/LTE-A receiver for first RF spectrum band 1212 or the LTE/LTE-A receiver for second RF spectrum band 1214, may be used to receive various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the first radio frequency spectrum band or the second radio frequency spectrum band.

In some examples, the transmitter 1230 may include at least one RF transmitter, such as at least one RF transmitter operable to transmit over the first radio frequency spectrum band or the second radio frequency spectrum band. The transmitter 1230 may in some cases include separate transmitters for the first radio frequency spectrum band and the second radio frequency spectrum band. The separate transmitters may, in some examples, take the form of an LTE/LTE-A transmitter for communicating over the first radio frequency spectrum band (e.g., LTE/LTE-A transmitter for first RF spectrum band 1232), and an LTE/LTE-A transmitter for communicating over the second radio frequency spectrum band (e.g., LTE/LTE-A transmitter for second RF spectrum band 1234). The transmitter 1230, including the LTE/LTE-A transmitter for first RF spectrum band 1232 or the LTE/LTE-A transmitter for second RF spectrum band 1234, may be used to transmit various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the first radio frequency spectrum band or the second radio frequency spectrum band.

In some examples, the wireless communication management component 1220 may be used to manage one or more aspects of wireless communication for the apparatus 1215. In some examples, the wireless communication management component 1220 may include a UL CC determination component 1235, a UCI identification component 1240, a UCI-to-UL CC mapping component 1245, or a CCA component 1285.

In some examples, the UL CC determination component 1235 may be used to determine a set of UL CCs to use for the apparatus 1215. The set of UL CCs may include at least one UL CC in the first radio frequency spectrum band and at least one UL CC in the second radio frequency spectrum band. In some examples, the UL CC determination component 1235 may determine the set of UL CCs for an uplink carrier aggregation operation. In some examples, the UL CC determination component 1235 may determine the set of UL CCs for a dual-connectivity operation, for use as a primary group of CCs or a secondary group of CCs in the dual-connectivity operation.

In some examples, the UCI identification component 1240 may be used to identify, for a subframe, UCI due for transmission. The UCI may be associated with one or more CCs. In some examples, the UCI may include at least one type of periodic UCI. In some examples, the UCI may include all types of periodic UCI. In some examples, the UCI may include an SR, an ACK/NAK, or periodic CSI. In some examples, the UCI may include aperiodic CSI. In some examples, the UCI may include all types of UCI.

In some examples, the UCI-to-UL CC mapping component 1245 may be used to limit available UL CCs for transmission of the UCI to the at least one UL CC in the first radio frequency spectrum band. In some examples, the UCI-to-UL CC mapping component 1245 may include a PUCCH/PUSCH availability determination component 1250, a PUCCH selection component 1255, a PUSCH selection component 1260, a UCI type-based mapping component 1275, or an aperiodic CSI mapping component 1280.

In some examples, the PUCCH/PUSCH availability determination component 1250 may be used to determine whether the apparatus 1215 is configured for parallel PUCCH and PUSCH transmissions during a subframe. The PUCCH/PUSCH availability determination component 1250 may also be used to determine whether a PUSCH transmission is available in the first radio frequency spectrum band during a subframe (e.g., determine whether the apparatus 1215 has received an uplink grant for transmitting a PUSCH on a UL CC in the first radio frequency spectrum band).

In some examples, the PUCCH selection component 1255 may be used to limit the available UL CCs for transmission of UCI, during a subframe, to at least a PUCCH CC in the first radio frequency spectrum band when the PUCCH/PUSCH availability determination component 1250 determines that a PUSCH transmission is unavailable in the first radio frequency spectrum band during a subframe, regardless of whether the apparatus 1215 is configured for parallel PUCCH and PUSCH transmissions during the subframe.

In some examples, the PUSCH selection component 1260 may be used to limit the available UL CCs for transmission of UCI to a first PUSCH CC in the first radio frequency spectrum band when the PUCCH/PUSCH availability determination component 1250 determines that the apparatus 1215 is configured for parallel PUCCH and PUSCH transmissions during the subframe and a PUSCH transmission is available in the first radio frequency spectrum band. In some examples, the PUSCH selection component 1260 may include an aperiodic CSI-based selection component 1265 or a CC index-based selection component 1270. The aperiodic CSI-based selection component 1265 may be used to determine whether aperiodic CSI has been triggered to be transmitted on a PUSCH CC during a subframe, and when it is determined that aperiodic CSI has been triggered on a PUSCH CC during the subframe, to select the first PUSCH CC based at least in part on the aperiodic CSI being triggered to be transmitted on the first PUSCH CC during the subframe. The CC index-based selection component 1270 may be used, for example, when it is determined that aperiodic CSI has not been triggered on a PUSCH CC during the subframe. The CC index-based selection component 1270 may be used to select the first PUSCH CC based at least in part on a first CC index associated with the first PUSCH CC.

In some examples, the PUSCH selection component 1260 and/or UCI type-based mapping component 1275 may be used to limit the available UL CCs for transmission of UCI to one or more PUSCHs when the PUCCH/PUSCH availability determination component 1250 determines that the apparatus 1215 is configured for parallel PUCCH and PUSCH transmissions during the subframe and a PUSCH transmission is available in the first radio frequency spectrum band. For example, the UCI type-based mapping component 1275 may determine that UCI to be transmitted during a subframe includes a first type of information and limit the available UL CCs for transmission of the UCI to a PUCCH CC in the first radio frequency spectrum band based at least in part on the first type of information. In some examples, the first type of information may include an SR, or an ACK/NAK, or an SR and an ACK/NAK, or periodic CSI. In another example, the UCI type-based mapping component 1275 may determine that UCI to be transmitted during a subframe includes a second type of information and limit the available UL CCs to a PUSCH CC in the first radio frequency spectrum band to transmit a first portion of the second type of information, and a PUCCH CC in the first radio frequency spectrum band to transmit a second portion of the second type of information. In some examples, the second type of information may include periodic CSI and at least one of: an SR, an ACK/NAK, or a combination of the SR and the ACK/NAK. In some examples, the first portion of the second type of information may include the periodic CSI, and the second portion of the second type of information may include the SR, the ACK/NAK, or the combination of the SR and the ACK/NAK. When more than one PUSCH CC is available to transmit the first portion of the second type of information, a PUSCH CC may be selected using the PUSCH selection component 1260, the aperiodic CSI-based selection component 1265, or the CC index-based selection component 1270.

In some examples, and when aperiodic CSI is triggered to be transmitted during a subframe, the aperiodic CSI mapping component 1280 may be used to limit available UL CCs for a transmission of UCI to a UL CC in the first radio frequency spectrum band, and/or to one or more UL CCs in the second radio frequency spectrum band for which aperiodic CSI is triggered to be transmitted during the subframe. Aperiodic CSI for a UL CC in the second radio frequency spectrum band may be transmitted on the UL CC for which the aperiodic CSI is triggered to be transmitted, while any aperiodic CSI for a UL CC in the first radio frequency spectrum band, or any other UCI, may be transmitted on the UL CC in the first radio frequency spectrum band. In some examples, the other UCI may include UCI such as an SR, an ACK/NAK, or periodic CSI.

In some examples, the CCA component 1285 may be used to contend for access to the second radio frequency spectrum band. In some examples, the CCA component 1285 may contend for access to the second radio frequency spectrum band by performing a UCCA, as described, for example, with reference to FIG. 3. A UCCA may be performed for each of a number of UL CCs. Upon winning a contention for access to the second radio frequency spectrum band, for a UL CC in the second radio frequency spectrum band, the CCA component 1285 may enable the wireless communication management component 1220 to transmit a CUBS on the UL CC in the second radio frequency spectrum band, and subsequently, transmit data or control signals on the UL CC in the second radio frequency spectrum band.

In some examples, aspects of the apparatuses 1115 and 1215 described with reference to FIGS. 11 and 12 may be combined.

Figure 13:
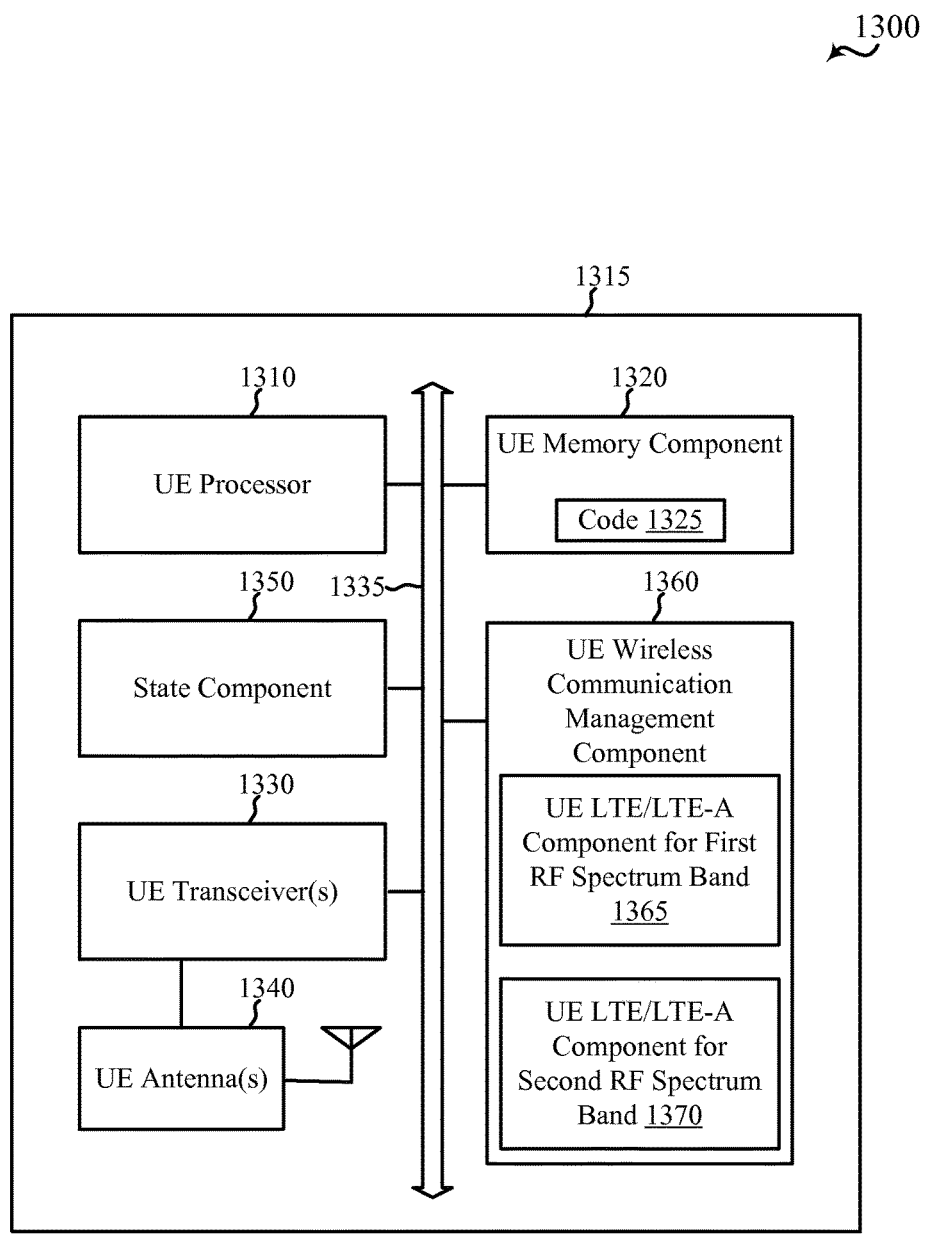
FIG. 13 shows a block diagram of a UE for use in wireless communication, in accordance with various aspects of the present disclosure.

FIG. 13 shows a block diagram 1300 of a UE 1315 for use in wireless communication, in accordance with various aspects of the present disclosure. The UE 1315 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1315 may, in some examples, have an internal power supply (not shown), such as a small battery, to facilitate mobile operation. In some examples, the UE 1315 may be an example of aspects of one or more of the UE 115, 215, 215-a, 215-b, 215-c, 415, or 515 described with reference to FIG. 1, 2, 4, or 5, or aspects of one or more of the apparatuses 1115 or 1215 described with reference to FIG. 11 or 12. The UE 1315 may be configured to implement at least some of the UE or apparatus features and functions described with reference to FIG. 1, 2, 3, 4, 5, 6, 7A, 7B, 8A, 8B, 9, 10, 11, or 12.

The UE 1315 may include a UE processor 1310, a UE memory component 1320, at least one UE transceiver (represented by UE transceiver(s) 1330), at least one UE antenna (represented by UE antenna(s) 1340), or a UE wireless communication management component 1360. Each of these components may be in communication with each other, directly or indirectly, over one or more buses 1335.

The UE memory component 1320 may include random access memory (RAM) or read-only memory (ROM). The UE memory component 1320 may store computer-readable, computer-executable code 1325 containing instructions that are configured to, when executed, cause the UE processor 1310 to perform various functions described herein related to wireless communication, including limiting available UL CCs for transmission of UCI. Alternatively, the code 1325 may not be directly executable by the UE processor 1310 but be configured to cause the UE 1315 (e.g., when compiled and executed) to perform various of the functions described herein.

The UE processor 1310 may include an intelligent hardware device (e.g., a central processing unit (CPU), a microcontroller, an ASIC, etc.). The UE processor 1310 may process information received through the UE transceiver(s) 1330 or information to be sent to the UE transceiver(s) 1330 for transmission through the UE antenna(s) 1340. The UE processor 1310 may handle, alone or in connection with the UE wireless communication management component 1360, various aspects of communicating over (or managing communications over) a first radio frequency spectrum band (e.g., a dedicated radio frequency spectrum band for which apparatuses do not contend for access because the radio frequency spectrum band is licensed to one or more users for various uses, such as a licensed radio frequency spectrum band usable for LTE/LTE-A communications) or a second radio frequency spectrum band (e.g., a shared radio frequency spectrum band for which apparatuses may contend for access (e.g., a radio frequency spectrum band that is available for unlicensed use, such as Wi-Fi use, or a radio frequency spectrum band that is available for use by multiple operators in an equally shared or prioritized manner)).

The UE transceiver(s) 1330 may include a modem configured to modulate packets and provide the modulated packets to the UE antenna(s) 1340 for transmission, and to demodulate packets received from the UE antenna(s) 1340. The UE transceiver(s) 1330 may, in some examples, be implemented as one or more UE transmitters and one or more separate UE receivers. The UE transceiver(s) 1330 may support communications in the first radio frequency spectrum band or the second radio frequency spectrum band. The UE transceiver(s) 1330 may be configured to communicate bi-directionally, via the UE antenna(s) 1340, with one or more of the base stations 105, 205, 205-a, 405, 505, or 505-a described with reference to FIG. 1, 2, 4, or 5. While the UE 1315 may include a single UE antenna, there may be examples in which the UE 1315 may include multiple UE antennas 1340.

The UE state component 1350 may be used, for example, to manage transitions of the UE 1315 between an RRC idle state and an RRC connected state, and may be in communication with other components of the UE 1315, directly or indirectly, over the one or more buses 1335. The UE state component 1350, or portions of it, may include a processor, or some or all of the functions of the UE state component 1350 may be performed by the UE processor 1310 or in connection with the UE processor 1310.

The UE wireless communication management component 1360 may be configured to perform or control some or all of the UE or apparatus features or functions described with reference to FIG. 1, 2, 3, 4, 5, 6, 7A, 7B, 8A, 8B, 9, 10, 11, or 12 related to wireless communication over a dedicated radio frequency spectrum band or a shared radio frequency spectrum band. For example, the UE wireless communication management component 1360 may be configured to support a supplemental downlink mode, a carrier aggregation mode, a standalone mode, or a dual-connectivity mode using the dedicated radio frequency spectrum band or the shared radio frequency spectrum band. The UE wireless communication management component 1360 may include a UE LTE/LTE-A component for first RF spectrum band 1365 configured to handle LTE/LTE-A communications in the first radio frequency spectrum band, and a UE LTE/LTE-A component for second RF spectrum band 1370 configured to handle LTE/LTE-A communications in the second radio frequency spectrum band. The UE wireless communication management component 1360, or portions of it, may include a processor, or some or all of the functions of the UE wireless communication management component 1360 may be performed by the UE processor 1310 or in connection with the UE processor 1310. In some examples, the UE wireless communication management component 1360 may be an example of the wireless communication management component 1120 or 1220 described with reference to FIG. 11 or 12.

Figure 14:
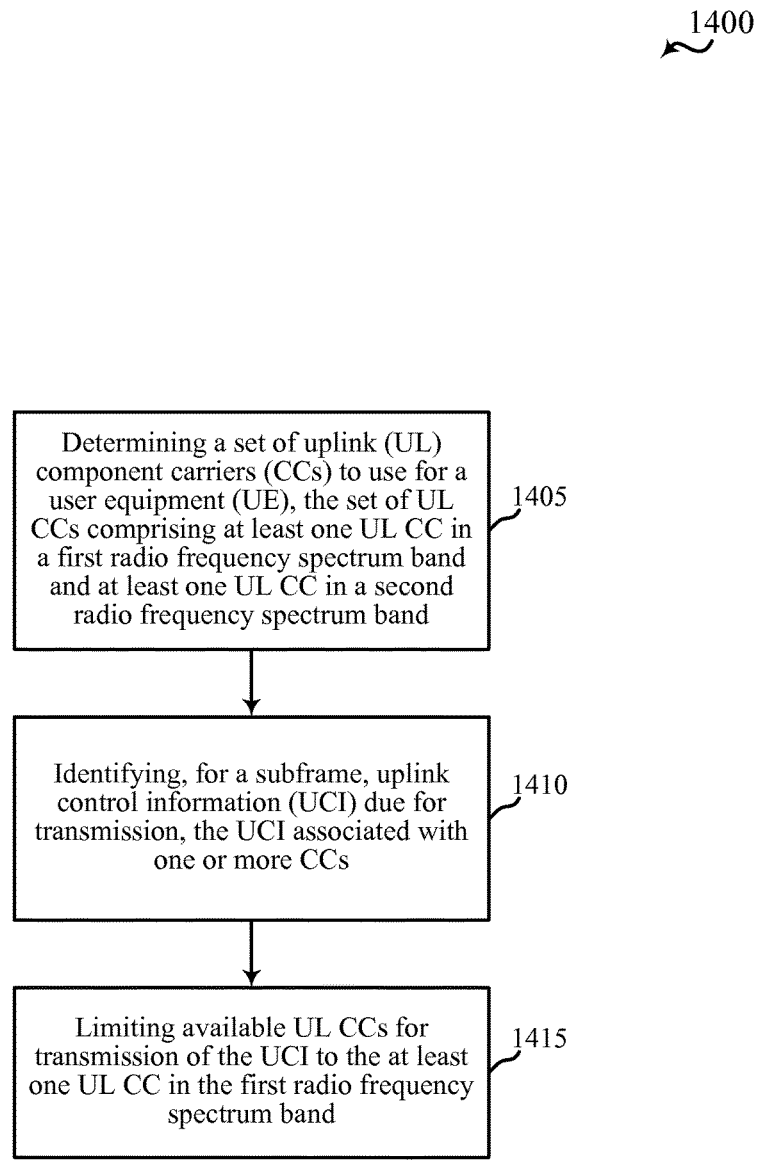
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115, 215, 215-a, 215-b, 215-c, 415, 515, or 1315 described with reference to FIG. 1, 2, 4, 5, or 13, or aspects of one or more of the apparatuses 1115 or 1215 described with reference to FIG. 11 or 12. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1405, the method 1400 may include determining a set of UL CCs to use for a UE. The set of UL CCs may include at least one UL CC in a first radio frequency spectrum band and at least one UL CC in a second radio frequency spectrum band. In some examples, the first radio frequency spectrum band may be a dedicated radio frequency spectrum band, and the second radio frequency spectrum band may be a shared radio frequency spectrum band. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the determining may include determining the set of UL CCs for an uplink carrier aggregation operation. In some examples, the determining may include determining the set of UL CCs for a dual-connectivity operation, for use as a primary group of CCs or a secondary group of CCs in the dual-connectivity operation. The operation(s) at block 1405 may be performed using the wireless communication management component 1120, 1220, or 1360 described with reference to FIG. 11, 12, or 13, or the UL CC determination component 1135 or 1235 described with reference to FIG. 11 or 12.

At block 1410, the method 1400 may include identifying, for a subframe, UCI due for transmission. The UCI may be associated with one or more CCs. In some examples, the UCI may include at least one type of periodic UCI. In some examples, the UCI may include all types of periodic UCI. In some examples, the UCI may include an SR, an ACK/NAK, or periodic CSI. In some examples, the UCI may include aperiodic CSI. In some examples, the UCI may include all types of UCI. The operation(s) at block 1410 may be performed using the wireless communication management component 1120, 1220, or 1360 described with reference to FIG. 11, 12, or 13, or the UCI identification component 1140 or 1240 described with reference to FIG. 11 or 12.

At block 1415, the method 1400 may include limiting available UL CCs for transmission of the UCI to the at least one UL CC in the first radio frequency spectrum band. The operation(s) at block 1415 may be performed using the wireless communication management component 1120, 1220, or 1360 described with reference to FIG. 11, 12, or 13, or the UCI-to-UL CC mapping component 1145 or 1245 described with reference to FIG. 11 or 12.

When the set of UL CCs to use for the UE includes two or more UL CCs in the first radio frequency spectrum band, and in some examples, a UL CC used for transmitting UCI may be selected from among the two or more UL CCs in the first radio frequency spectrum band based at least in part on rules used to select a UL CC for transmission of UCI in accordance with LTE/LTE-A communications in a dedicated radio frequency spectrum band.

Thus, the method 1400 may provide for wireless communication. It should be noted that the method 1400 is just one implementation and that the operations of the method 1400 may be rearranged or otherwise modified such that other implementations are possible.

Figure 15:
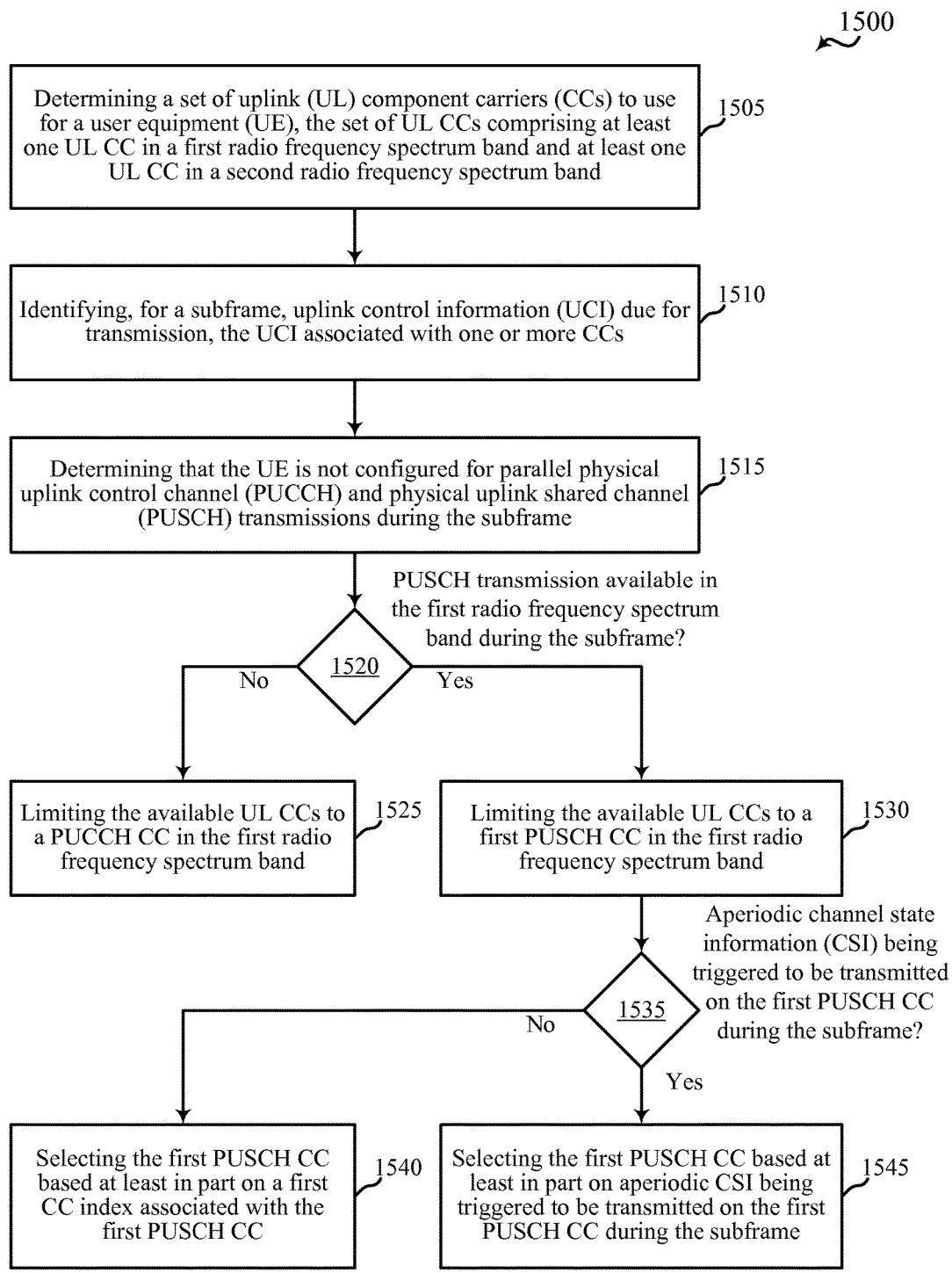
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, 215-a, 215-b, 215-c, 415, 515, or 1315 described with reference to FIG. 1, 2, 4, 5, or 13, or aspects of one or more of the apparatuses 1115 or 1215 described with reference to FIG. 11 or 12. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may include determining a set of UL CCs to use for a UE. The set of UL CCs may include at least one UL CC in a first radio frequency spectrum band and at least one UL CC in a second radio frequency spectrum band. In some examples, the first radio frequency spectrum band may be a dedicated radio frequency spectrum band, and the second radio frequency spectrum band may be a shared radio frequency spectrum band. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the determining may include determining the set of UL CCs for an uplink carrier aggregation operation. In some examples, the determining may include determining the set of UL CCs for a dual-connectivity operation, for use as a primary group of CCs or a secondary group of CCs in the dual-connectivity operation. The operation(s) at block 1505 may be performed using the wireless communication management component 1120, 1220, or 1360 described with reference to FIG. 11, 12, or 13, or the UL CC determination component 1135 or 1235 described with reference to FIG. 11 or 12.

At block 1510, the method 1500 may include identifying, for a subframe, UCI due for transmission. The UCI may be associated with one or more CCs. In some examples, the UCI may include at least one type of periodic UCI. In some examples, the UCI may include all types of periodic UCI. In some examples, the UCI may include an SR, an ACK/NAK, or periodic CSI. In some examples, the UCI may include aperiodic CSI. In some examples, the UCI may include all types of UCI. The operation(s) at block 1510 may be performed using the wireless communication management component 1120, 1220, or 1360 described with reference to FIG. 11, 12, or 13, or the UCI identification component 1140 or 1240 described with reference to FIG. 11 or 12.

At block 1515, block 1520, block 1525, block 1530, block 1535, block 1540, and/or block 1545, the method 1500 may include limiting available UL CCs for transmission of the UCI to the at least one UL CC in the first radio frequency spectrum band. At block 1515, the method 1500 may include determining that the UE is not configured for parallel PUCCH and PUSCH transmissions during the subframe.

At block 1520, the method 1500 may include determining whether a PUSCH transmission is available in the first radio frequency spectrum band during the subframe (e.g., the method 1500 may include determining whether the UE has received an uplink grant for transmitting a PUSCH on one of the UL CCs in the first radio frequency spectrum band). When it is determined that a PUSCH transmission is unavailable in the first radio frequency spectrum band, the method 1500 may continue at block 1525. When it is determined that a PUSCH transmission is available in the first radio frequency spectrum band, the method 1500 may continue at block 1530.

The operation(s) at block 1515 or 1520 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUCCH/PUSCH availability determination component 1250 described with reference to FIG. 12.

At block 1525, the method 1500 may include limiting the available UL CCs to a PUCCH CC in the first radio frequency spectrum band. The operation(s) at block 1525 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUCCH selection component 1255 described with reference to FIG. 12.

At block 1530, the method 1500 may include limiting the available UL CCs to a first PUSCH CC in the first radio frequency spectrum band. The operation(s) at block 1530 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUSCH selection component 1260 described with reference to FIG. 12.

At block 1535, the method 1500 may include determining whether aperiodic CSI has been triggered to be transmitted on the first PUSCH CC during the subframe. When it is determined that aperiodic CSI has not been triggered, the method 1500 may continue at block 1540. When it is determined that aperiodic CSI has been triggered, the method 1500 may continue at block 1545. The operation(s) at block 1535 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUSCH selection component 1260 or aperiodic CSI-based selection component 1265 described with reference to FIG. 12.

At block 1545, the method 1500 may include selecting the first PUSCH CC based at least in part on the aperiodic CSI being triggered to be transmitted on the first PUSCH CC during the subframe. The operation(s) at block 1545 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUSCH selection component 1260 or aperiodic CSI-based selection component 1265 described with reference to FIG. 12.

At block 1540, the method 1500 may include selecting the first PUSCH CC based at least in part on a first CC index associated with the first PUSCH CC. In some examples, selecting the first PUSCH CC based at least in part on the first CC index may include selecting the first PUSCH CC based at least in part on the first CC index being lower than a second CC index associated with a second PUSCH CC. The operation(s) at block 1540 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUSCH selection component 1260 or CC index-based selection component 1270 described with reference to FIG. 12.

Thus, the method 1500 may provide for wireless communication. It should be noted that the method 1500 is just one implementation and that the operations of the method 1500 may be rearranged or otherwise modified such that other implementations are possible.

Figure 16:
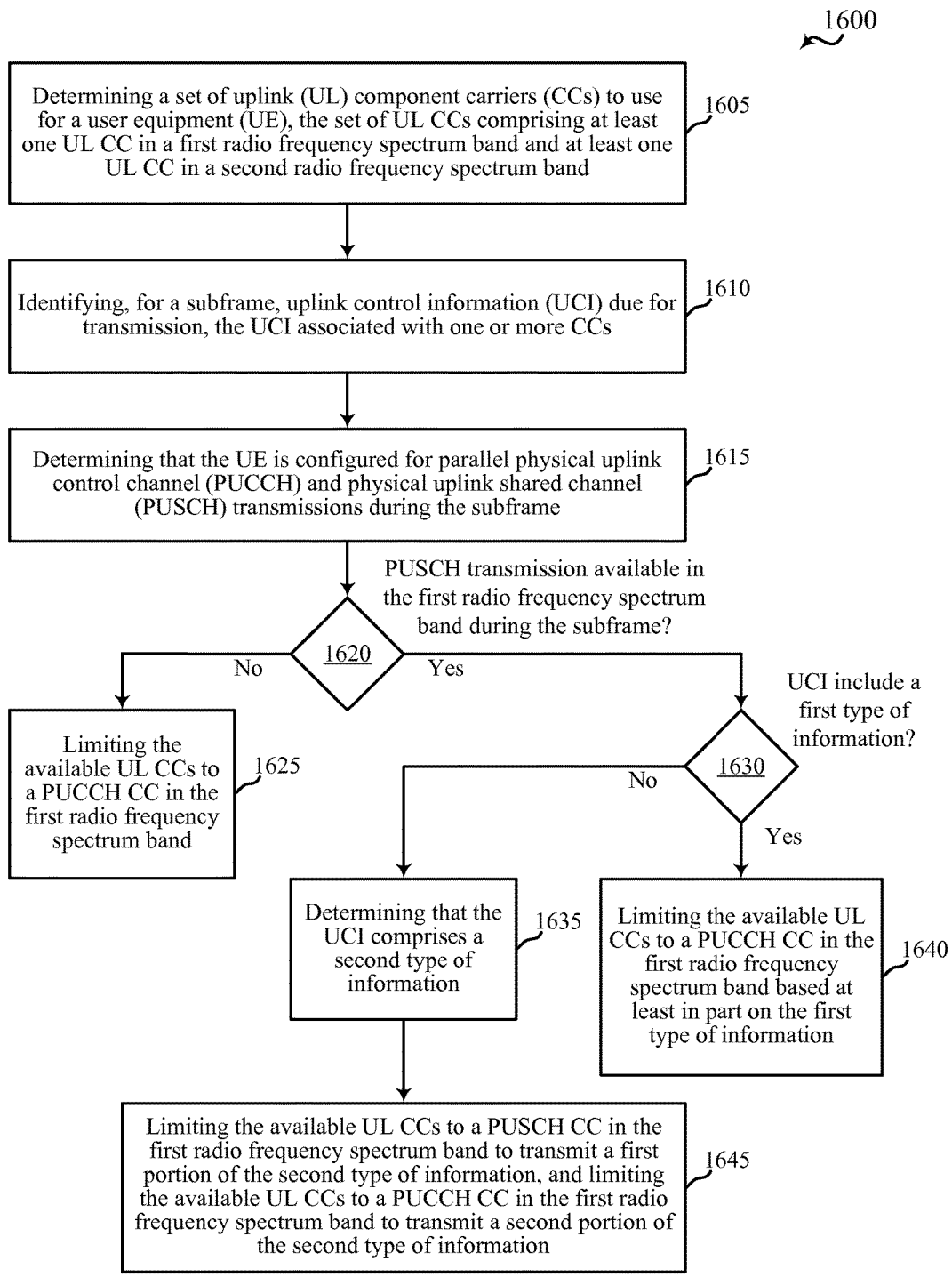
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, 215, 215-*a*, 215-*b*, 215-*c*, 415, 515, or 1315 described with reference to FIG. 1, 2, 4, 5, or 13, or aspects of one or more of the apparatuses 1115 or 1215 described with reference to FIG. 11 or 12. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1605, the method 1600 may include determining a set of UL CCs to use for a UE. The set of UL CCs may include at least one UL CC in a first radio frequency spectrum band and at least one UL CC in a second radio frequency spectrum band. In some examples, the first radio frequency spectrum band may be a dedicated radio frequency spectrum band, and the second radio frequency spectrum band may be a shared radio frequency spectrum band. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the determining may include determining the set of UL CCs for an uplink carrier aggregation operation. In some examples, the determining may include determining the set of UL CCs for a dual-connectivity operation, for use as a primary group of CCs or a secondary group of CCs in the dual-connectivity operation. The operation(s) at block 1605 may be performed using the wireless communication management component 1120, 1220, or 1360 described with reference to FIG. 11, 12, or 13, or the UL CC determination component 1135 or 1235 described with reference to FIG. 11 or 12.

At block 1610, the method 1600 may include identifying, for a subframe, UCI due for transmission. The UCI may be associated with one or more CCs. In some examples, the UCI may include at least one type of periodic UCI. In some examples, the UCI may include all types of periodic UCI. In some examples, the UCI may include an SR, an ACK/NAK, or periodic CSI. In some examples, the UCI may include aperiodic CSI. In some examples, the UCI may include all types of UCI. The operation(s) at block 1610 may be performed using the wireless communication management component 1120, 1220, or 1360 described with reference to FIG. 11, 12, or 13, or the UCI identification component 1140 or 1240 described with reference to FIG. 11 or 12.

At block 1615, block 1620, block 1625, block 1630, block 1635, block 1640, and/or block 1645, the method 1600 may include limiting available UL CCs for transmission of the UCI to the at least one UL CC in the first radio frequency spectrum band. At block 1615, the method 1600 may include determining that the UE is configured for parallel PUCCH and PUSCH transmissions during the subframe.

At block 1620, the method 1600 may include determining whether a PUSCH transmission is available in the first radio frequency spectrum band during the subframe (e.g., the method 1600 may include determining whether the UE has received an uplink grant for transmitting a PUSCH on one of the UL CCs in the first radio frequency spectrum band). When it is determined that a PUSCH transmission is unavailable in the first radio frequency spectrum band, the method 1600 may continue at block 1625. When it is determined that a PUSCH transmission is available in the first radio frequency spectrum band, the method 1600 may continue at block 1630.

The operation(s) at block 1615 or 1620 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUCCH/PUSCH availability determination component 1250 described with reference to FIG. 12.

At block 1625, the method 1600 may include limiting the available UL CCs to a PUCCH CC in the first radio frequency spectrum band. The operation(s) at block 1625 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUCCH selection component 1255 described with reference to FIG. 12.

At block 1630, the method 1600 may include determining whether the UCI includes a first type of information. When it is determined that the UCI does not include the first type of information, the method 1600 may continue at block 1635. When it is determined that the UCI does include the first type of information, the method 1600 may continue at block 1645. In some examples, the first type of information may include an SR, or an ACK/NAK, or an SR and an ACK/NAK, or periodic CSI. The operation(s) at block 1630 may be performed using the wireless communication management component 1120, 1220, or 1360 described with reference to FIG. 11, 12, or 13, the UCI-to-UL CC mapping component 1145 or 1245 described with reference to FIG. 11 or 12, or the UCI type-based mapping component 1275 described with reference to FIG. 12.

At block 1635, the method 1600 may include determining that the UCI includes a second type of information. In some examples, the second type of information may include periodic CSI and at least one of: an SR, an ACK/NAK, or a combination of the SR and the ACK/NAK. The operation(s) at block 1635 may be performed using the wireless communication management component 1120, 1220, or 1360 described with reference to FIG. 11, 12, or 13, the UCI-to-UL CC mapping component 1145 or 1245 described with reference to FIG. 11 or 12, or the UCI type-based mapping component 1275 described with reference to FIG. 12.

At block 1640, the method 1600 may include limiting the available UL CCs to a PUCCH CC in the first radio frequency spectrum band based at least in part on the first type of information. The operation(s) at block 1640 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUCCH selection component 1255 described with reference to FIG. 12.

At block 1645, the method 1600 may include limiting the available UL CCs to a PUSCH CC in the first radio frequency spectrum band to transmit a first portion of the second type of information, and limiting the available UL CCs to a PUCCH CC in the first radio frequency spectrum band to transmit a second portion of the second type of information. In some examples, the first portion of the second type of information may include the periodic CSI, and the second portion of the second type of information may include the SR, the ACK/NAK, or the combination of the SR and the ACK/NAK. When more than one PUSCH CC is available to transmit the first portion of the second type of information, a PUSCH CC may be selected as described with reference to blocks 1535, 1540, or 1545 of FIG. 15. The operation(s) at block 1645 may be performed using the wireless communication management component 1120, 1220, or 1360 described with reference to FIG. 11, 12, or 13, the UCI-to-UL CC mapping component 1145 or 1245 described with reference to FIG. 11 or 12, or the PUCCH selection component 1255, PUSCH selection component 1260, aperiodic CSI-based selection component 1265, or CC index-based selection component 1270, described with reference to FIG. 12.

Thus, the method 1600 may provide for wireless communication. It should be noted that the method 1600 is just one implementation and that the operations of the method 1600 may be rearranged or otherwise modified such that other implementations are possible.

Figure 17:
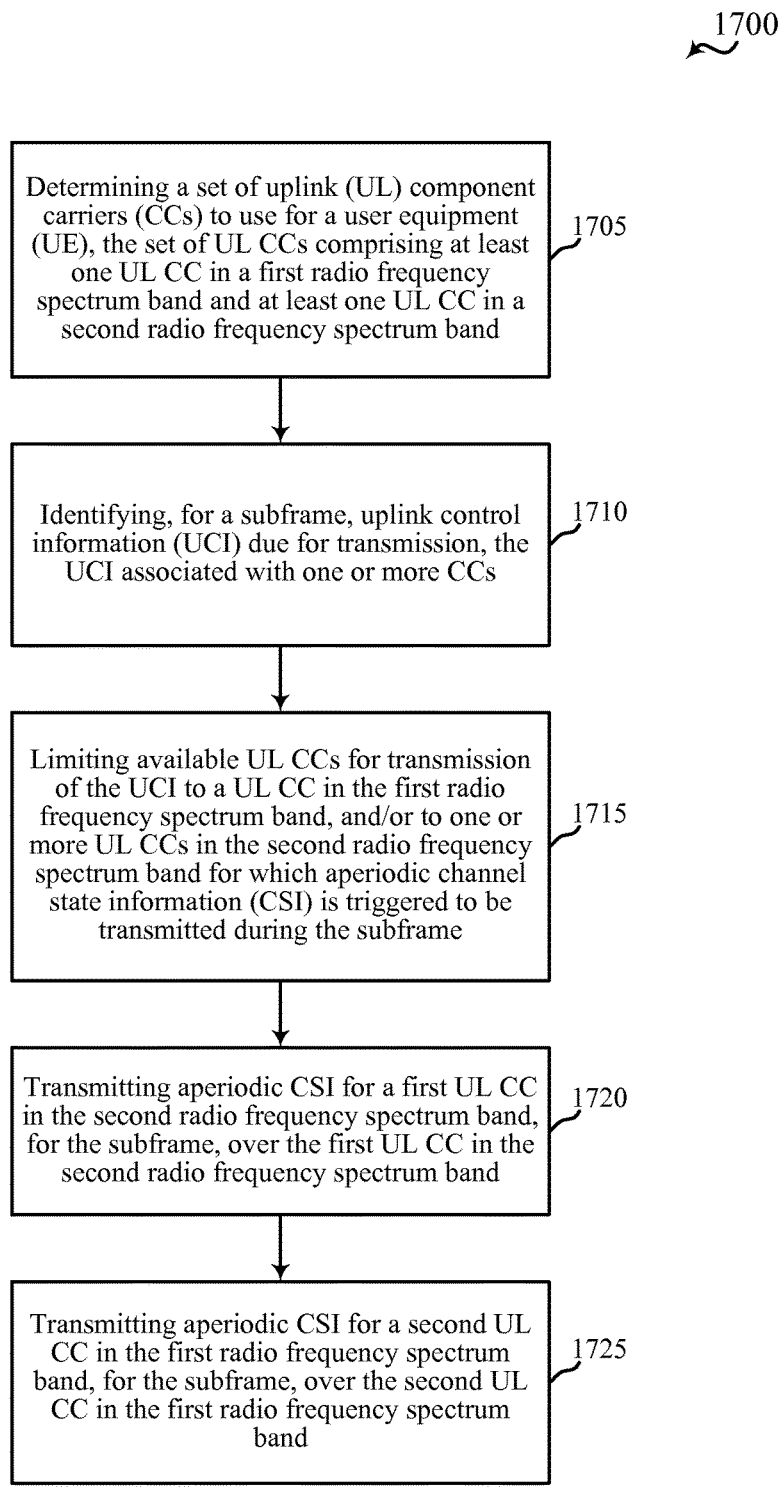
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115, 215, 215-*a*, 215-*b*, 215-*c*, 415, 515, or 1315 described with reference to FIG. 1, 2, 4, 5, or 13, or aspects of one or more of the apparatuses 1115 or 1215 described with reference to FIG. 11 or 12. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1705, the method 1700 may include determining a set of UL CCs to use for a UE. The set of UL CCs may include at least one UL CC in a first radio frequency spectrum band and at least one UL CC in a second radio frequency spectrum band. In some examples, the first radio frequency spectrum band may be a dedicated radio frequency spectrum band, and the second radio frequency spectrum band may be a shared radio frequency spectrum band. The dedicated radio frequency spectrum band may be a radio frequency spectrum band for which transmitting apparatuses may not contend for access because the radio frequency spectrum band is licensed to one or more users for various uses, such as a licensed radio frequency spectrum band usable for LTE/LTE-A communications. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the determining may include determining the set of UL CCs for an uplink carrier aggregation operation. In some examples, the determining may include determining the set of UL CCs for a dual-connectivity operation, for use as a primary group of CCs or a secondary group of CCs in the dual-connectivity operation. The operation(s) at block 1705 may be performed using the wireless communication management component 1120, 1220, or 1360 described with reference to FIG. 11, 12, or 13, or the UL CC determination component 1135 or 1235 described with reference to FIG. 11 or 12.

At block 1710, the method 1700 may include identifying, for a subframe, due for transmission. The UCI may be associated with one or more CCs. In some examples, the UCI may include aperiodic CSI. The UCI may also include at least one type of periodic UCI. In some examples, the UCI may include aperiodic CSI and all types of periodic UCI. In some examples, the UCI may include all types of UCI. The operation(s) at block 1710 may be performed using the wireless communication management component 1120, 1220, or 1360 described with reference to FIG. 11, 12, or 13, or the UCI identification component 1140 or 1240 described with reference to FIG. 11 or 12.

At block 1715, the method 1700 may include limiting available UL CCs for transmission of the UCI to a UL CC in the first radio frequency spectrum band, and/or to one or more UL CCs in the second radio frequency spectrum band for which aperiodic CSI is triggered to be transmitted during the subframe.

At block 1720, the method 1700 may include transmitting aperiodic CSI for a first UL CC in the second radio frequency spectrum band, for the subframe, over the first UL CC in the second radio frequency spectrum band.

At block 1725, and when aperiodic CSI is triggered to be transmitted during the subframe for a second UL CC in the first radio frequency spectrum band, the method 1700 may include transmitting the aperiodic CSI for the second UL CC in the first radio frequency spectrum band, for the subframe, over the second UL CC in the first radio frequency spectrum band.

The operation(s) at block 1715, 1720, or 1725 may be performed using the wireless communication management component 1120, 1220, or 1360 described with reference to FIG. 11, 12, or 13, the UCI-to-UL CC mapping component 1145 or 1245 described with reference to FIG. 11 or 12, or the aperiodic CSI mapping component 1280 described with reference to FIG. 12.

In some examples of the method 1700, other UCI, such as an SR, an ACK/NAK, or periodic CSI, may also be transmitted during the subframe. In these examples, the other UCI may be transmitted on a UL CC in the first radio frequency spectrum band (e.g., on the first UL CC in the first radio frequency spectrum band).

Thus, the method 1700 may provide for wireless communication. It should be noted that the method 1700 is just one implementation and that the operations of the method 1700 may be rearranged or otherwise modified such that other implementations are possible.

In some examples, aspects of two or more of the methods 1400, 1500, 1600, or 1700 described with reference to FIG. 14, 15, 16, or 17 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   determining a set of uplink (UL) component carriers (CCs) to use for a user equipment (UE), the set of UL CCs comprising at least one UL CC in a first radio frequency spectrum band and at least one UL CC in a second radio frequency spectrum band;
   identifying, for a subframe, uplink control information (UCI) due for transmission, wherein the UCI is associated with one or more CCs;
   limiting available UL CCs for transmission of the UCI to the at least one UL CC in the first radio frequency spectrum band; and
   transmitting an indicator for the UE, wherein the indicator is associated with the limiting.

2. The method of claim 1, wherein the first radio frequency spectrum band is a dedicated radio frequency spectrum band, and wherein the second radio frequency spectrum band is a shared radio frequency spectrum band.

3. The method of claim 1, wherein the determining comprises:
   determining the set of UL CCs for an uplink carrier aggregation operation.

4. The method of claim 1, wherein the determining comprises:
   determining the set of UL CCs for a dual-connectivity operation, for use as a primary group of CCs or a secondary group of CCs in the dual-connectivity operation.

5. The method of claim 1, wherein the limiting comprises:
determining that the UE is not configured for parallel physical uplink control channel (PUCCH) and physical uplink shared channel (PUSCH) transmissions during the subframe.

6. The method of claim 5, further comprising:
determining that a PUSCH transmission is unavailable in the first radio frequency spectrum band during the subframe; and
limiting the available UL CCs to a PUCCH CC in the first radio frequency spectrum band.

7. The method of claim 5, further comprising:
determining that at least one PUSCH transmission is available in the first radio frequency spectrum band during the subframe; and
limiting the available UL CCs to a first PUSCH CC in the first radio frequency spectrum band.

8. The method of claim 7, further comprising:
selecting the first PUSCH CC based at least in part on aperiodic channel state information (CSI) being triggered to be transmitted on the first PUSCH CC during the subframe.

9. The method of claim 7, further comprising:
selecting the first PUSCH CC based at least in part on a first CC index associated with the first PUSCH CC.

10. The method of claim 9, wherein selecting the first PUSCH CC based at least in part on the first CC index comprises:
selecting the first PUSCH CC based at least in part on the first CC index being lower than a second CC index associated with a second PUSCH CC.

11. The method of claim 1, wherein the limiting comprises:
determining that the UE is configured for parallel physical uplink control channel (PUCCH) and physical uplink shared channel (PUSCH) transmissions during the subframe.

12. The method of claim 11, further comprising:
determining that a PUSCH transmission is unavailable in the first radio frequency spectrum band during the subframe; and
limiting the available UL CCs to a PUCCH CC in the first radio frequency spectrum band.

13. The method of claim 11, further comprising:
determining that at least one PUSCH transmission is available in the first radio frequency spectrum band during the subframe;
determining that the UCI comprises a first type of information; and
limiting the available UL CCs to a PUCCH CC in the first radio frequency spectrum band based at least in part on the first type of information.

14. The method of claim 13, wherein the first type of information comprises a scheduling request (SR), or an acknowledgement (ACK)/non-acknowledgement (NAK), or an SR and an ACK/NAK, or periodic channel state information (CSI).

15. The method of claim 11, further comprising:
determining that at least one PUSCH transmission is available in the first radio frequency spectrum band during the subframe;
determining that the UCI comprises a second type of information;
limiting the available UL CCs to a PUSCH CC in the first radio frequency spectrum band to transmit a first portion of the second type of information; and
limiting the available UL CCs to a PUCCH CC in the first radio frequency spectrum band to transmit a second portion of the second type of information.

16. The method of claim 15, wherein the second type of information comprises periodic channel state information (CSI) and at least one of:
a scheduling request (SR), an acknowledgment/non-acknowledgement (ACK/NAK), or a combination of the SR and the ACK/NAK.

17. The method of claim 16, wherein the first portion of the second type of information comprises the periodic CSI, and the second portion of the second type of information comprises the SR, the ACK/NAK, or the combination of the SR and the ACK/NAK.

18. The method of claim 1, wherein the UCI comprises at least one type of periodic UCI.

19. The method of claim 1, wherein the UCI comprises all types of periodic UCI.

20. The method of claim 1, wherein the UCI comprises aperiodic channel state information (CSI).

21. The method of claim 1, further comprising:
transmitting aperiodic channel state information (CSI) for a first UL CC in the second radio frequency spectrum band, for the subframe, over the first UL CC in the second radio frequency spectrum band.

22. The method of claim 21, further comprising:
transmitting aperiodic CSI for a second UL CC in the first radio frequency spectrum band, for the subframe, over the second UL CC in the first radio frequency spectrum band.

23. The method of claim 1, wherein the indicator comprises the UCI, and wherein transmitting the indicator comprises:
transmitting the UCI on one or more of the at least one UL CC in the first radio frequency spectrum band.

24. The method of claim 23, wherein the UCI comprises one or more of: a scheduling request (SR), or an acknowledgement (ACK)/non-acknowledgement (NAK), or periodic channel state information (CSI), or aperiodic CSI.

25. An apparatus for wireless communication, comprising:
a processor;
memory in electronic communication with the processor; and
the processor and memory configured to:
determine a set of uplink (UL) component carriers (CCs) to use for a user equipment (UE), the set of UL CCs comprising at least one UL CC in a first radio frequency spectrum band and at least one UL CC in a second radio frequency spectrum band;
identify, for a subframe, uplink control information (UCI) due for transmission, wherein the UCI is associated with one or more CCs;
limit available UL CCs for transmission of the UCI to the at least one UL CC in the first radio frequency spectrum band; and
transmit an indicator for the UE, wherein the indicator is associated with the limiting.

26. The apparatus of claim 25, wherein the first radio frequency spectrum band is a dedicated radio frequency spectrum band, and wherein the second radio frequency spectrum band is a shared radio frequency spectrum band.

27. The apparatus of claim 25, wherein the processor and memory are further configured to:
  determine that the UE is not configured for parallel physical uplink control channel (PUCCH) and physical uplink shared channel (PUSCH) transmissions during the subframe.

28. The apparatus of claim 27, wherein the processor and memory are further configured to:
  determine that a PUSCH transmission is unavailable in the first radio frequency spectrum band during the subframe; and
  limit the available UL CCs to a PUCCH CC in the first radio frequency spectrum band.

29. The apparatus of claim 27, wherein the processor and memory are further configured to:
  determine that at least one PUSCH transmission is available in the first radio frequency spectrum band during the subframe; and
  limit the available UL CCs to a first PUSCH CC in the first radio frequency spectrum band.

30. The apparatus of claim 25, wherein the processor and memory are further configured to:
  determine that the UE is configured for parallel physical uplink control channel (PUCCH) and physical uplink shared channel (PUSCH) transmissions during the subframe.

31. The apparatus of claim 25, wherein the indicator comprises the UCI, and wherein, to transmit the indicator for the UE, the processor and memory are further configured to:
  transmit the UCI on one or more of the at least one UL CC in the first radio frequency spectrum band.

32. The apparatus of claim 31, wherein the UCI comprises one or more of: a scheduling request (SR), or an acknowledgement (ACK)/non-acknowledgement (NAK), or periodic channel state information (CSI), or aperiodic CSI.

33. An apparatus for wireless communication, comprising:
  means for determining a set of uplink (UL) component carriers (CCs) to use for a user equipment (UE), the set of UL CCs comprising at least one UL CC in a first radio frequency spectrum band and at least one UL CC in a second radio frequency spectrum band;
  means for identifying, for a subframe, uplink control information (UCI) due for transmission, wherein the UCI is associated with one or more CCs;
  means for limiting available UL CCs for transmission of the UCI to the at least one UL CC in the first radio frequency spectrum band; and
  means for transmitting an indicator for the UE, wherein the indicator is associated with the limiting.

34. The apparatus of claim 33, wherein the indicator comprises the UCI, and wherein the means for transmitting the indicator comprises:
  means for transmitting the UCI on one or more of the at least one UL CC in the first radio frequency spectrum band.

35. The apparatus of claim 34, wherein the UCI comprises one or more of: a scheduling request (SR), or an acknowledgement (ACK)/non-acknowledgement (NAK), or periodic channel state information (CSI), or aperiodic CSI.

36. A non-transitory computer-readable medium storing computer-executable code for wireless communications, the code executable by a processor to:
  determine a set of uplink (UL) component carriers (CCs) to use for a user equipment (UE), the set of UL CCs comprising at least one UL CC in a first radio frequency spectrum band and at least one UL CC in a second radio frequency spectrum band;
  identify, for a subframe, uplink control information (UCI) due for transmission, wherein the UCI is associated with one or more CCs;
  limit available UL CCs for transmission of the UCI to the at least one UL CC in the first radio frequency spectrum band; and
  transmit an indicator for the UE, wherein the indicator is associated with the limiting.

37. The non-transitory computer-readable medium of claim 36, wherein the indicator comprises the UCI, and wherein the code to transmit the indicator is executable by the processor to:
  transmit the UCI on one or more of the at least one UL CC in the first radio frequency spectrum band.

38. The non-transitory computer-readable medium of claim 37, wherein the UCI comprises one or more of: a scheduling request (SR), or an acknowledgement (ACK)/non-acknowledgement (NAK), or periodic channel state information (CSI), or aperiodic CSI.

* * * * *